US012752907B2

(12) United States Patent
Takemura et al.

(10) Patent No.: US 12,752,907 B2
(45) Date of Patent: Oct. 6, 2026

(54) PROPULSION DEVICE, PROPULSION CONTROL DEVICE, AND COMPUTER READABLE STORAGE MEDIUM

(71) Applicant: DENSO CORPORATION, Kariya-city (JP)

(72) Inventors: Yuichi Takemura, Kariya-city (JP); Mariko Hashimoto, Kariya-city (JP); Shinsuke Kawazu, Kariya-city (JP); Jiro Hayashi, Kariya-city (JP); Hideaki Suzuki, Kariya-city (JP); Keita Fujii, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/956,811

(22) Filed: Nov. 22, 2024

(65) Prior Publication Data

US 2025/0083797 A1 Mar. 13, 2025

Related U.S. Application Data

(63) Continuation of application No. PCT/JP2023/019114, filed on May 23, 2023.

(30) Foreign Application Priority Data

Jun. 29, 2022 (JP) ................................ 2022-105084
May 17, 2023 (JP) ................................ 2023-081861

(51) Int. Cl.
*B64C 11/00* (2006.01)

(52) U.S. Cl.
CPC ................................ *B64C 11/002* (2013.01)

(58) Field of Classification Search
CPC ............................. B64C 11/002; B64C 27/72
See application file for complete search history.

(56) References Cited

U.S. PATENT DOCUMENTS

2014/0010656 A1* 1/2014 Nies ..................... F03D 7/0244 29/889
2016/0039529 A1* 2/2016 Buchmueller .......... B64C 11/00 244/65
2016/0280086 A1 9/2016 Lopez et al.
2017/0160750 A1* 6/2017 Kimchi ................ G05D 1/2272
2020/0257314 A1 8/2020 Kimchi et al.
2020/0385134 A1 12/2020 Buchmueller et al.

(Continued)

FOREIGN PATENT DOCUMENTS

CN 203039518 U * 7/2013
CN 111003153 A * 4/2020 ........... B64C 11/002
CN 112124566 A * 12/2020 ............ B64U 30/20

(Continued)

*Primary Examiner* — Ryan C Clark
(74) *Attorney, Agent, or Firm* — Oliff PLC

(57) ABSTRACT

A lock device can be shifted between a locked state and an unlocked state. The lock device includes a lock pin, a solenoid, and a pressing unit. The lock pin is movable between a locked position where a propeller is locked and an unlocked position where the propeller is not locked. The pressing unit presses the lock pin to the locked position by a mechanical pressing force. The solenoid includes a solenoid coil and a plunger. When the solenoid coil is energized, the plunger moves the lock pin to the unlocked position against the mechanical pressing force.

12 Claims, 16 Drawing Sheets

(56) References Cited

U.S. PATENT DOCUMENTS

2022/0258869 A1 8/2022 Fujishima

FOREIGN PATENT DOCUMENTS

| | | | | | |
|---|---|---|---|---|---|
| CN | 112537446 | A | | 3/2021 | |
| CN | 113844649 | A | | 12/2021 | |
| DE | 10 2007 000 637 | A1 | | 5/2008 | |
| FR | 3111326 | A1 | * | 12/2021 | ............. B64D 31/18 |
| FR | 3 115 266 | A1 | | 4/2022 | |
| FR | 3122165 | A1 | * | 10/2022 | ............. B64C 11/00 |
| GB | 1110062 | A | * | 4/1968 | ............. B64C 27/72 |
| GB | 2307118 | A | * | 5/1997 | ........... F16D 63/006 |
| JP | H07-284533 | A | | 10/1995 | |
| WO | WO-2010070717 | A1 | * | 6/2010 | ............. H02K 7/102 |

* cited by examiner

PROPULSION DEVICE, PROPULSION CONTROL DEVICE, AND COMPUTER READABLE STORAGE MEDIUM

CROSS REFERENCE TO RELATED APPLICATION

The present application is a continuation application of International Patent Application No. PCT/JP2023/019114 filed on May 23, 2023, which designated the U.S. and claims the benefit of priority from Japanese Patent Applications No. 2022-105084 filed on Jun. 29, 2022 and No. 2023-081861 filed on May 17, 2023. The entire disclosures of all of the above applications are incorporated herein by reference.

TECHNICAL FIELD

The present disclosure relates to a propulsion device, a propulsion control device, and a computer readable storage medium.

BACKGROUND

Conventionally, a known aircraft is configured to fly in the air using multiple rotary blades.

SUMMARY

A disclosed aspect is a propulsion device configured to cause a motor to rotate a rotary blade to propel a flight vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
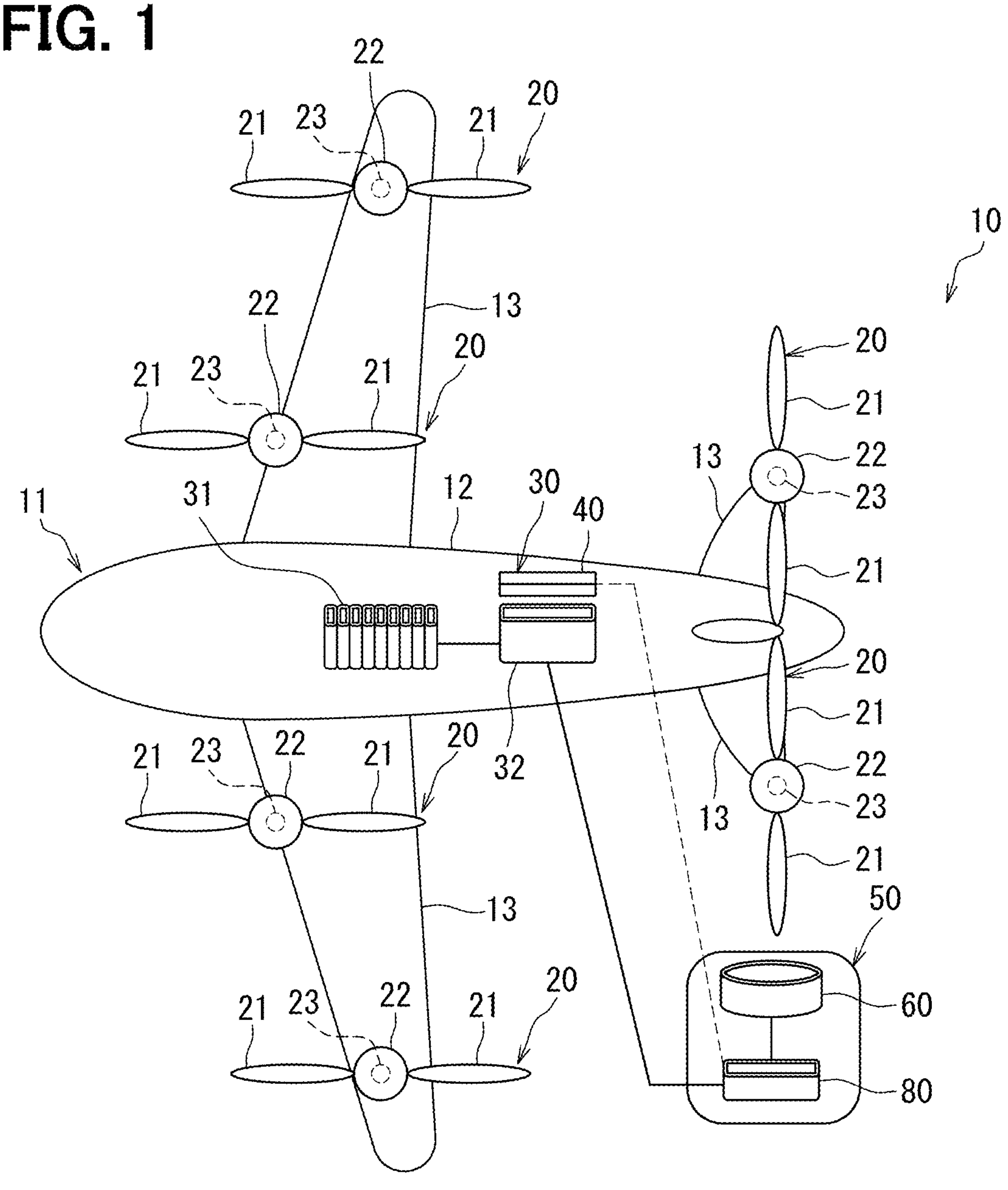
FIG. 1 is a diagram showing a configuration of an eVTOL in a first embodiment.

Hereinafter, examples of the present disclosure will be described.

According to an example of the present disclosure, an aircraft is configured to fly using multiple rotary blades. The aircraft includes a motor that drives the rotary blades to rotate, and a control device that controls the motor. In the aircraft, the control device locks rotation of the motor such that rotation of each of the rotary blades is locked within a specific angle range.

It is noted that, when the lock of the rotary blade is continued, energization of the motor may be continued in order to allow the control device to lock the rotation of the motor. Therefore, electric power is consumed by the motor even though the rotary blade is locked so as not to rotate. Accordingly, electric power consumed during flying of the aircraft may be increased.

A disclosed example is a propulsion device configured to cause a motor to rotate a rotary blade to propel a flight vehicle. The propulsion device comprises: a restriction member movable between a restriction position, at which the restriction member is caught in a reception portion, which is configured to rotate together with the rotary blade, to restrict rotation of the rotary blade, and a permission position, at which the restriction member is not caught in the reception portion, to permit rotation of the rotary blade; and an energization drive unit including an energization unit and configured to energize the energization unit to drive the restriction member to move from one of the restriction position and the permission position to the other of the restriction position and the permission position.

According to the propulsion device described above, the restriction member is moved from one of the restriction position and the permission position to the other by energizing the energization unit. In the configuration, the rotation of the rotary blade can be restricted by the restriction member by controlling the energization of the energization unit such that the restriction member is located at the restriction position. Therefore, it is not necessary to energize a motor for a purpose of restricting the rotation of the rotary blade. Accordingly, it is possible to avoid a situation in which the motor continues to consume electric power even though the rotation of the rotary blade is restricted. Accordingly, electric power consumed during flying of the flight vehicle can be reduced.

A disclosed example is a propulsion control device configured to control rotation of a rotary blade via a motor to propel a flight vehicle. The propulsion control device comprises: a restriction execution unit configured to perform energization control on an energization unit to execute a restriction process to move a restriction member to a restriction position, at which the restriction member is caught in a reception portion, which is configured to rotate together with the rotary blade, to restrict rotation of the rotary blade; and a permission execution unit configured to perform the energization control on the energization unit to execute a permission process to move the restriction member to a permission position, at which the restriction member is not caught in the reception portion, to permit rotation of the rotary blade.

According to the propulsion control device described above, similarly to the propulsion device, the electric power consumed during flying of the flight vehicle can be reduced.

A disclosed example is a propulsion control program is for controlling rotation of a rotary blade via a motor to propel a flight vehicle. The propulsion control program is configured to cause at least one processor to function as: a restriction execution unit configured to perform energization control on an energization unit to execute a restriction process to move a restriction member to a restriction position, at which the restriction member is caught in a reception portion, which is configured to rotate together with the rotary blade, to restrict rotation of the rotary blade; and a permission execution unit configured to perform the energization control on the energization unit to execute a permission process to move the restriction member to a permission position, at which the restriction member is not caught in the reception portion, to permit rotation of the rotary blade.

According to the propulsion control program described above, similarly to the propulsion device, the electric power consumed during flying of the flight vehicle can be reduced.

Hereinafter, multiple embodiments for carrying out the present disclosure will be described with reference to the drawings. In each embodiment, the same reference numerals are assigned to portions corresponding to the items described in the preceding embodiments, and a repetitive description thereof may be omitted. In each embodiment, when only a part of the configuration is described, another embodiment previously described can be employed for the other part of the configuration. Not only combinations between portions that are specifically clarified as being able to be used in combination in each embodiment are possible, but also partial combinations between the embodiments whose combination is not specifically clarified are possible as long as no adverse effect is particularly generated on the combination.

First Embodiment

A flight system 30 shown in FIG. 1 is mounted on an eVTOL 10. The eVTOL 10 is an electric vertical take-off and landing aircraft, and can take off and land in a vertical direction. The eVTOL is an abbreviation of an electric vertical take-off and landing aircraft. The eVTOL 10 is an aircraft flying in the atmosphere and corresponds to a flight vehicle. The eVTOL 10 is also an electric-type electric aircraft and may be referred to as an electric flight vehicle. The eVTOL 10 is a manned aircraft carrying occupants. The flight system 30 is a system that drives the eVTOL 10 to fly.

The eVTOL 10 includes an airframe 11 and propellers 20. The airframe 11 includes an airframe main body 12 and wings 13. The airframe main body 12 is a body of the airframe 11 and has, for example, a shape extending in a front-rear direction. The airframe main body 12 has a passenger compartment for carrying occupants. Each of the wings 13 extends from the airframe main body 12 and multiple wings 13 are provided on the airframe main body 12. The wings 13 are fixed wings. The multiple wings 13 include a main wing, a tail wing, and the like.

Multiple propellers 20 are provided on the airframe 11. The eVTOL 10 is a multi-transponder including at least three propellers 20. For example, at least four propellers 20 are provided on the airframe 11. The propellers 20 are provided on the airframe main body 12 and the wings 13. Each of the propellers 20 rotates around a propeller axis. The propeller axis is, for example, a center line of the propeller 20. The propeller 20 can generate thrust and lift in the eVTOL 10. The propeller 20 corresponds to a rotary blade. The propeller 20 may be referred to as a rotor.

The propeller 20 includes blades 21, a boss 22, and a propeller shaft 23. The blades 21 are arranged in a circumferential direction of the propeller axis. The boss 22 couples the multiple blades 21. Each of the blades 21 extends from the boss 22 in a radial direction of the propeller axis. The propeller shaft 23 is a rotating shaft of the propeller 20 and extends along the propeller axis from the boss 22.

The eVTOL 10 is a tilt rotor aircraft. In the eVTOL 10, the propeller 20 can be tilted. That is, a tilt angle of the propeller 20 is adjustable. For example, when the eVTOL 10 ascends, an orientation of the propeller 20 is set such that the propeller axis extends in an upper-lower direction. In this case, the propeller 20 functions as a lift-propeller for generating lift in the eVTOL 10. When the eVTOL 10 moves forward, the orientation of the propeller 20 is set such that the propeller axis extends in a front-rear direction. In this case, the propeller 20 functions as a cruise-propeller for generating thrust in the eVTOL 10.

Figure 2:
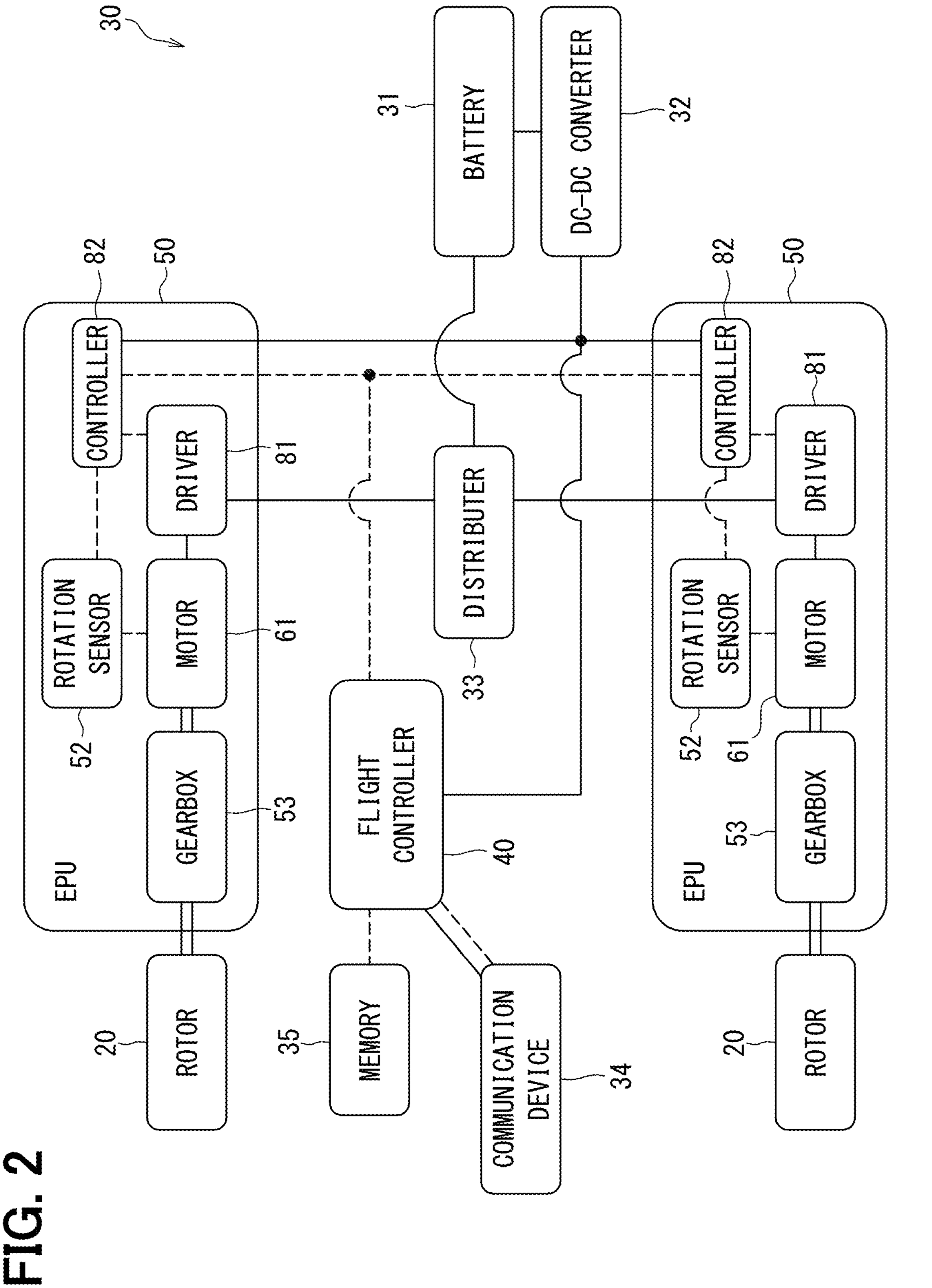
FIG. 2 is a block diagram showing an electrical configuration of the eVTOL.

As shown in FIGS. 1 and 2, the flight system 30 includes a battery 31, a distributor 32, a converter 33, a communication device 34, a storage device 35, a flight control device 40, and an EPU 50. In FIG. 2, the propeller 20 is illustrated as Rotor, the battery 31 is illustrated as Battery, the distributor 32 is illustrated as Distributer, and the converter 33 is illustrated as DC-DC Converter. The communication device 34 is illustrated as Communication Device, the storage device 35 is illustrated as Memory, and the flight control device 40 is illustrated as Flight Controller.

The battery 31 is electrically connected to the multiple EPUs 50. The battery 31 is a power supplying unit that supplies electric power to the EPUs 50, and corresponds to a power supply unit. The battery 31 is a DC voltage source that applies a DC voltage to the EDSs 50. The battery 31 has a rechargeable secondary battery. Examples of the secondary battery include a lithium-ion battery and a nickel-hydrogen battery. In addition to or instead of the battery 31, a fuel cell, a generator, or the like may be used as the power supply unit.

The distributor 32 is electrically connected to the battery 31 and the multiple EPUs 50. The distributor 32 distributes the electric power from the battery 31 to the multiple EPUs 50. The electric power distributed to the EPUs 50 by the distributor 32 is drive power for driving the EPUs 50. The converter 33 is electrically connected to the battery 31, the flight control device 40, and the EPUs 50. The converter 33 supplies the electric power from the battery 31 to the flight control device 40 and the EPUs 50. The electric power supplied to the flight control device 40 and the EPUs 50 by the converter 33 is control power used by the flight control device 40 and the EPUs 50 for control.

The flight control device 40 controls the flight system 30. The communication device 34 communicates with an external facility such as a control center. The storage device 35 stores information related to flight of the eVTOL 10.

The eVTOL 10 includes the EPUs 50. Each of the EPUs 50 is a device for driving the propeller 20 to rotate, and corresponds to a drive device. The EPU is an abbreviation of an electric propulsion unit. The EPU 50 may be referred to as a power drive device or a power drive system. The EPU 50 is provided individually for each of the multiple propellers 20. The EPU 50 is arranged on the propeller 20 along the propeller axis. All of the multiple EPUs 50 are fixed on the airframe 11. The EPU 50 rotatably supports the propeller 20. The EPU 50 is connected to the propeller 20. The propeller 20 is fixed to the airframe 11 with the EPU 50 interposed therebetween.

The eVTOL 10 includes a propulsion device 15. The propulsion device 15 is a device for propelling the eVTOL 10. The eVTOL 10 can fly, such as lift, by propulsion of the propulsion device 15. The propulsion device 15 includes the propeller 20 and the EPU 50. In the propulsion device 15, the propeller 20 rotates as the EPU 50 is driven. Multiple propulsion devices 15 are provided on the eVTOL 10.

Figure 5:
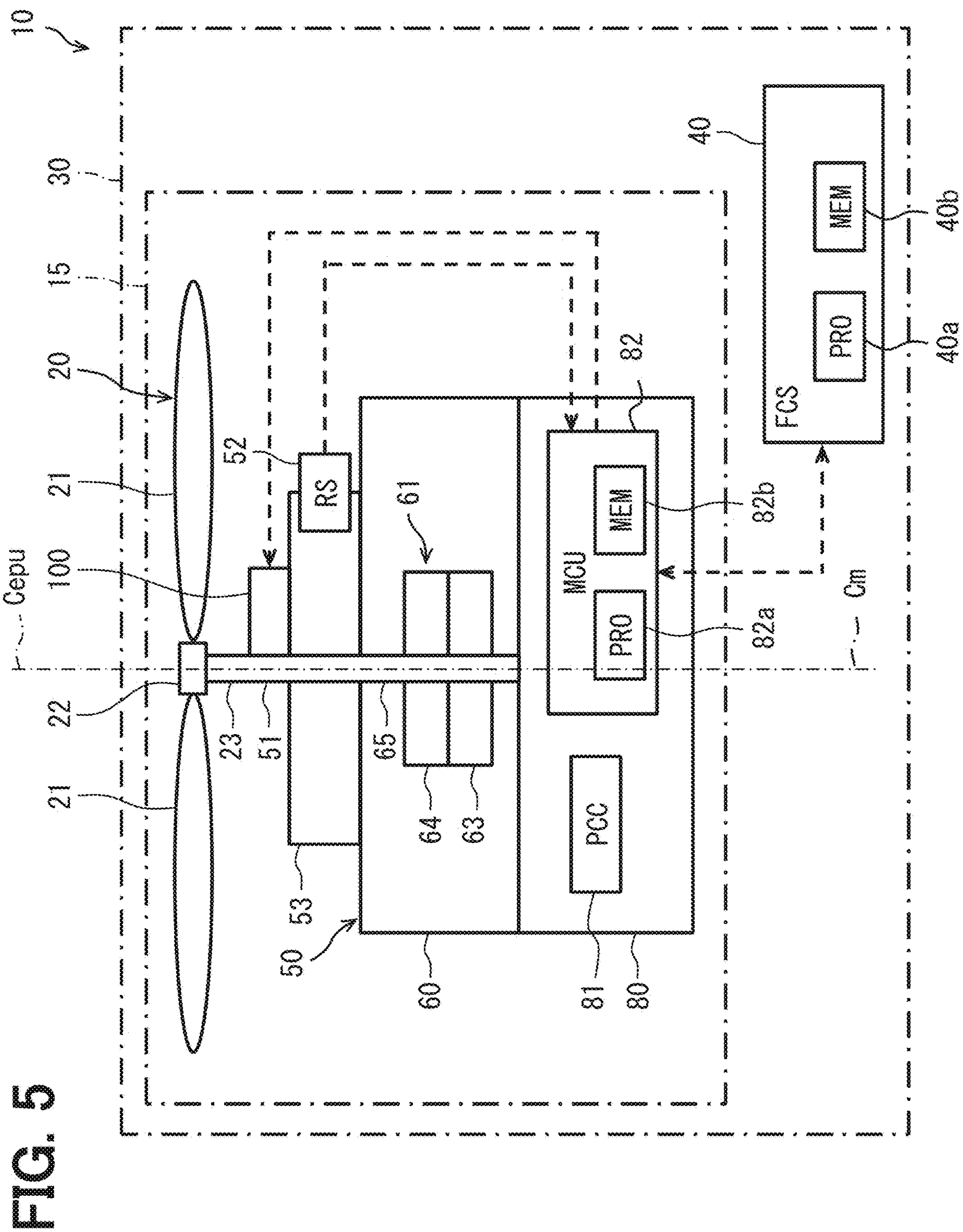
FIG. 5 is a schematic diagram showing a configuration of an EPU.

As shown in FIG. 5, the EPU 50 includes a motor device 60 and an inverter device 80. In the EPU 50, the motor device 60 and the inverter device 80 are arranged along a motor axis Cm. The motor device 60 includes a motor 61 and a motor housing. The motor housing accommodates the motor 61. The motor 61 is a rotary electric machine and is a multi-phase AC motor. The motor 61 is, for example, a three-phase motor.

The motor 61 includes a motor stator 63, a motor rotor 64, and a motor shaft 65. The motor stator 63 is a stator, and the motor rotor 64 is a rotor. The motor shaft 65 is fixed to the motor rotor 64 and rotates together with the motor rotor 64. The motor 61 is an axial gap-type rotary electric machine. In the motor 61, the motor stator 63 and the motor rotor 64 are arranged along the motor axis Cm.

The motor axis Cm is a rotation axis of the motor rotor 64. The motor rotor 64 rotates around the motor axis Cm. The motor axis Cm is, for example, a center line of the motor rotor 64. The motor axis Cm is also center lines of the motor 61 and the motor shaft 65. When rotation of the motor rotor 64 is referred to as rotation of the motor 61, the motor 61 rotates about the motor axis Cm.

The inverter device 80 includes an inverter 81, a motor control unit 82, and an inverter housing. The inverter housing accommodates the inverter 81 and the motor control unit 82. The inverter 81 converts the electric power supplied to the motor 61 from a direct current to an alternating current. The inverter 81 is a multi-phase power conversion unit. The inverter 81 is, for example, a three-phase inverter. The motor control unit 82 is, for example, an MCU, and controls driving of the motor 61. The MCU is an abbreviation of a motor control unit. The motor control unit 82 controls the motor 61 by controlling the inverter 81.

The EPU 50 includes an EPU shaft 51 and a gear 53. The EPU shaft 51 is made of a metal material or the like in a columnar shape. The EPU shaft 51 connects the motor 61 and the propeller 20. For example, the EPU shaft 51 connects the motor shaft 65 and the propeller shaft 23 via the gear 53. The EPU shaft 51 rotates around an EPU axis Cepu. The EPU axis Cepu is a rotation axis of the EPU shaft 51. The EPU axis Cepu is a center line of the EPU shaft 51.

The EPU shaft 51 and the propeller 20 are arranged in an axial direction AD along the EPU axis Cepu. For example, the EPU shaft 51, the boss 22, and the propeller shaft 23 are arranged in the axial direction AD. The axial direction AD is a direction in which the EPU axis Cepu extends. The EPU axis Cepu coincides with the propeller axis. Regarding the EPU axis Cepu, the axial direction AD, a radial direction RD, and a circumferential direction CD are orthogonal to one another. The EPU shaft 51 and the propeller 20 rotate in the circumferential direction CD. The circumferential direction CD corresponds to a rotation direction of the propeller 20. In the radial direction RD, an outer side may be referred to as a radially outer side, and an inner side may be referred to as a radially inner side. The EPU axis Cepu and the motor axis Cm may coincide with each other or may be deviated from each other in the radial direction RD.

The gear 53 mechanically connects the motor shaft 65 and the EPU shaft 51. The gear 53 transmits rotation of the motor shaft 65 to the EPU shaft 51. The gear 53 is provided, for example, between the propeller 20 and the motor device 60 in the axial direction AD. The gear 53 includes a speed reducer. The gear 53 may be referred to as a gear box.

In the propulsion device 15, as a method of cooling the EPU 50, an air cooling method is used. In the propulsion device 15, outside air flows on an outer peripheral side of the EPU 50 as the propeller 20 rotates, and thus the EPU 50 is cooled from an outer peripheral side. Therefore, as the propeller 20 rotates, heat of the motor device 60 and heat of the inverter device 80 are released to the outside air, and thus the EPU 50 is air-cooled.

The EPU 50 includes a rotation sensor 52. The rotation sensor 52 is provided for the EPU shaft 51. The rotation sensor 52 detects a rotation speed of the EPU shaft 51. For example, the rotation sensor 52 is provided on the gear 53. The rotation sensor 52 detects the rotation speed of the EPU shaft 51 as a rotation speed of the propeller 20. The rotation sensor 52 outputs a detection signal corresponding to the rotation speed of the EPU shaft 51 to the motor control unit 82. The rotation sensor 52 includes, for example, an encoder and a resolver.

A flight control device 40 controls the motor control unit 82. The flight control device 40 is, for example, an ECU, and performs flight control for causing the eVTOL 10 to fly. The flight control device 40 is a control device that controls the flight system 30. The ECU is an abbreviation of an electronic control unit. The flight control device 40 is mainly implemented by a computer. The computer includes a processor 40*a*, a memory 40*b*, an input/output interface, and a bus connecting these components. The flight control device 40 executes various processes such as a flight control process for performing the flight control by causing the processor 40*a* to execute a control program stored in the memory 40*b*.

The processor 40*a* is hardware for performing an arithmetic process coupled to the memory 40*b*. The processor 40*a* executes various processes such as the flight control process by accessing the memory 40*b*. The memory 40*b* is a storage medium that stores the control program and the like. For example, the memory 40*b* is a non-transitory tangible storage medium that non-temporarily stores computer readable programs and data. The memory 40*b* is a non-transitory tangible storage medium, and is implemented by a semi-conductor memory, a magnetic disk, or the like. The memory 40*b* stores, for example, the control program for performing the flight control. The control program for performing the flight control corresponds to a flight control program.

The motor control unit 82 controls the propulsion device 15 by controlling the motor 61. The motor control unit 82 performs propulsion control for propelling the eVTOL 10. The motor control unit 82 performs the propulsion control using detection results of various sensors such as the rotation sensor 52, command signals from the flight control device 40, and the like. The motor control unit 82 corresponds to a propulsion control device. The motor control unit 82 is mainly implemented by a computer. The computer includes a processor 82*a*, a memory 82*b*, an input/output interface, and a bus connecting these components. The motor control unit 82 executes various processes such as a propulsion control process for performing the propulsion control by causing the processor 82*a* to execute a control program stored in the memory 82*b*.

The processor 82*a* is hardware for performing an arithmetic process coupled to the memory 82*b*. The processor 82*a* executes various processes such as the flight control process by accessing the memory 82*b*. The memory 82*b* is a storage medium that stores the control program and the like. For example, the memory 82*b* is a non-transitory tangible storage medium that non-temporarily stores computer readable programs and data. The memory 82*b* is a non-transitory storage medium, and is implemented by a semi-conductor memory, a magnetic disk, or the like. The memory 82*b* stores, for example, the control program for performing the propulsion control. The control program for performing the propulsion control corresponds to a propulsion control program.

In FIG. 5 and the like, the flight control device 40 is illustrated as FCS, the processor 40*a* is illustrated as PRO, and the memory 40*b* is illustrated as MEM. The inverter 81 is illustrated as PCC, the motor control unit 82 is illustrated as MCU, the processor 82*a* is illustrated as PRO, the memory 82*b* is illustrated as MEM, and the rotation sensor 52 is illustrated as RS.

The propulsion device 15 includes a lock device 100. The lock device 100 can lock the propeller 20. The lock device 100 can shift between a locked state and an unlocked state. In the locked state, the lock device 100 locks the propeller 20 by restricting the rotation of the propeller 20. The lock device 100 holds the propeller 20 at a predetermined lock angle in the locked state. The lock angle may have a predetermined angle range.

The lock device 100 does not lock the propeller 20 in the unlocked state. In the unlocked state, the lock device 100 does not restrict the rotation of the propeller 20 and permits the rotation of the propeller 20. The unlocked state is a state in which the lock of the propeller 20 is released.

The motor control unit 82 controls the lock device 100. The motor control unit 82 can shift the lock device 100 between the locked state and the unlocked state. The flight control device 40 controls the lock device 100 via the motor control unit 82 by outputting a command signal to the motor control unit 82. The flight control device 40 individually controls the lock device 100 for each of the multiple propulsion devices 15.

The flight control device 40 controls the lock device 100 according to a flight state of the eVTOL 10. For example, when the eVTOL 10 is lifted for vertical take-off or the like, the flight control device 40 causes the motor 61 to drive the propeller 20 which functions as a lift-propeller to rotate. In this case, the flight control device 40 causes the lock device 100 to lock the propeller 20 which does not function as a lift-propeller.

Figure 3:
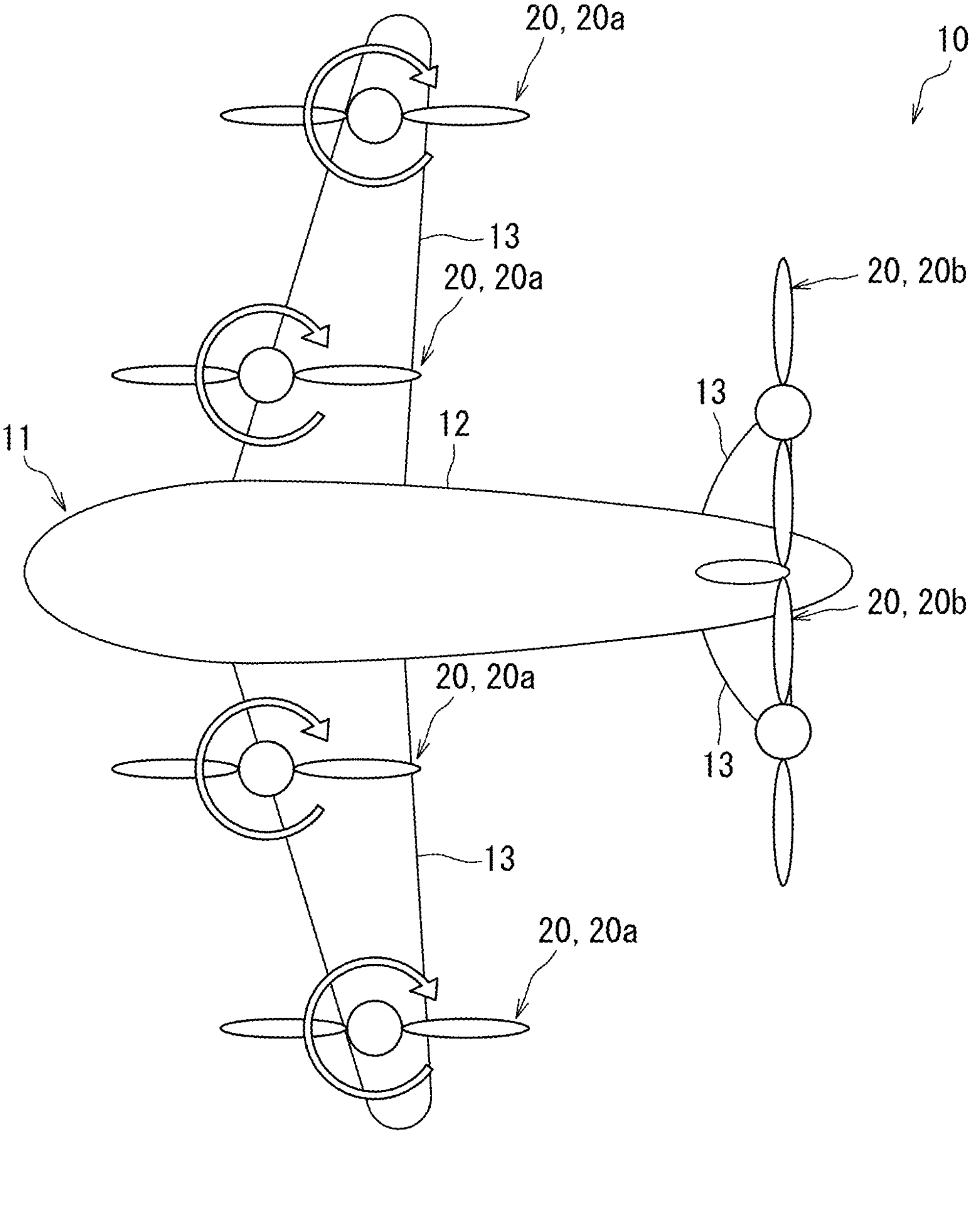
FIG. 3 is a diagram showing an arrangement of propellers to be locked during lifting of the eVTOL.

For example, as shown in FIG. 3, the flight control device 40 locks the propeller 20 which does not function as a lift-propeller in a state in which the propeller 20 extends along a pitch axis. For the propeller 20, a rotation angle in the state in which the propeller 20 extends along the pitch axis is the lock angle. By locking the propeller 20 in this manner, it is possible to avoid inconvenience such as disturbance of an air flow from the propeller 20 which does not function as a lift-propeller when the eVTOL 10 is lifted.

When the eVTOL 10 cruises, the flight control device 40 causes the motor 61 to drive the propeller 20 which functions as a cruise-propeller to rotate. In this case, the flight control device 40 causes the lock device 100 to lock the propeller 20 which does not function as a cruise-propeller.

Figure 4:
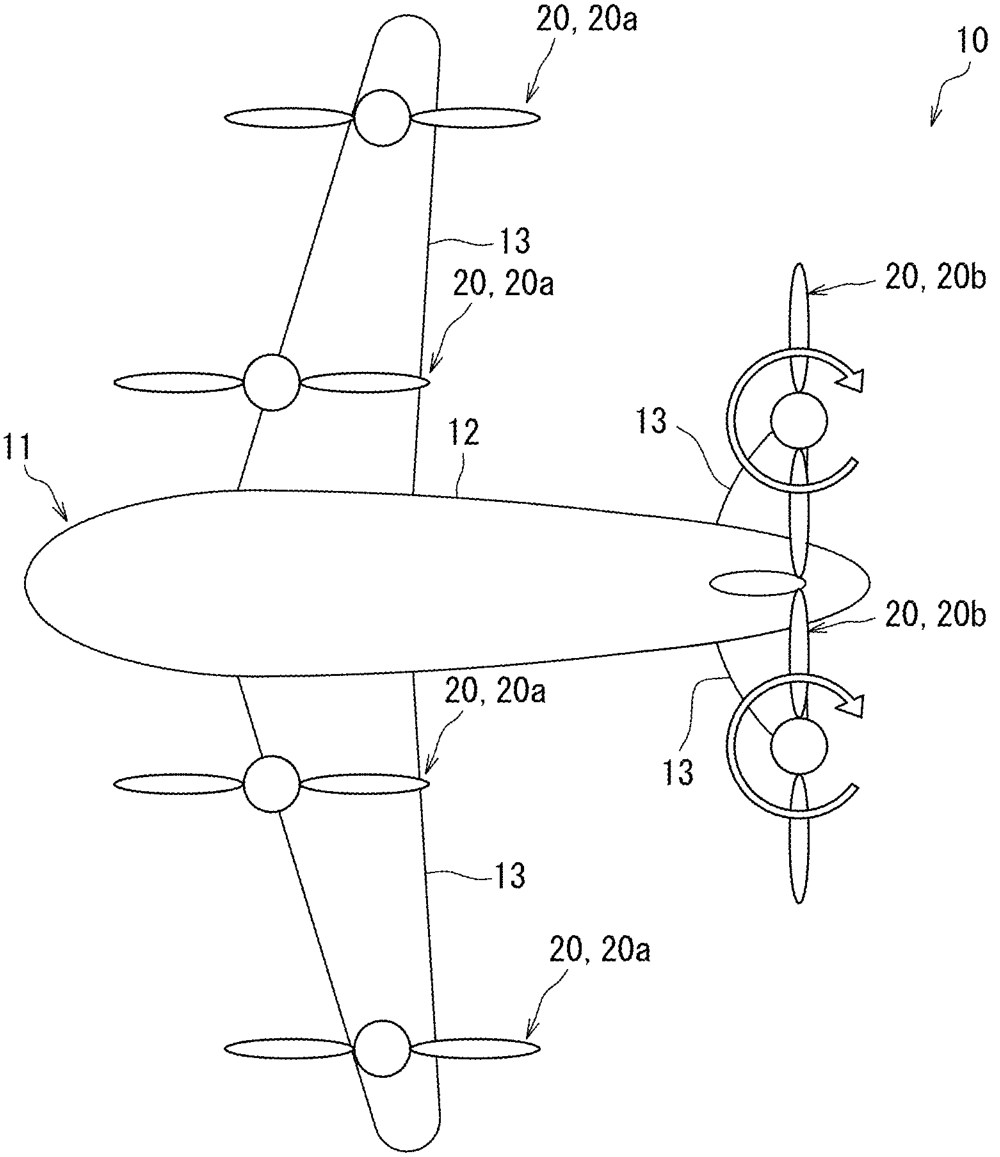
FIG. 4 is a diagram showing an arrangement of propellers to be locked during cruise of the eVTOL.

For example, as shown in FIG. 4, the flight control device 40 locks the propeller 20 which does not function as a cruise-propeller in a state in which the propeller 20 extends along a roll axis. For the propeller 20, a rotation angle in the state in which the propeller 20 extends along the roll axis is the lock angle. By locking the propeller 20 in this manner, it is possible to avoid inconvenience such as disturbance of an air flow from the propeller 20 which does not function as a cruise-propeller during cruise of the eVTOL 10.

Figure 6:
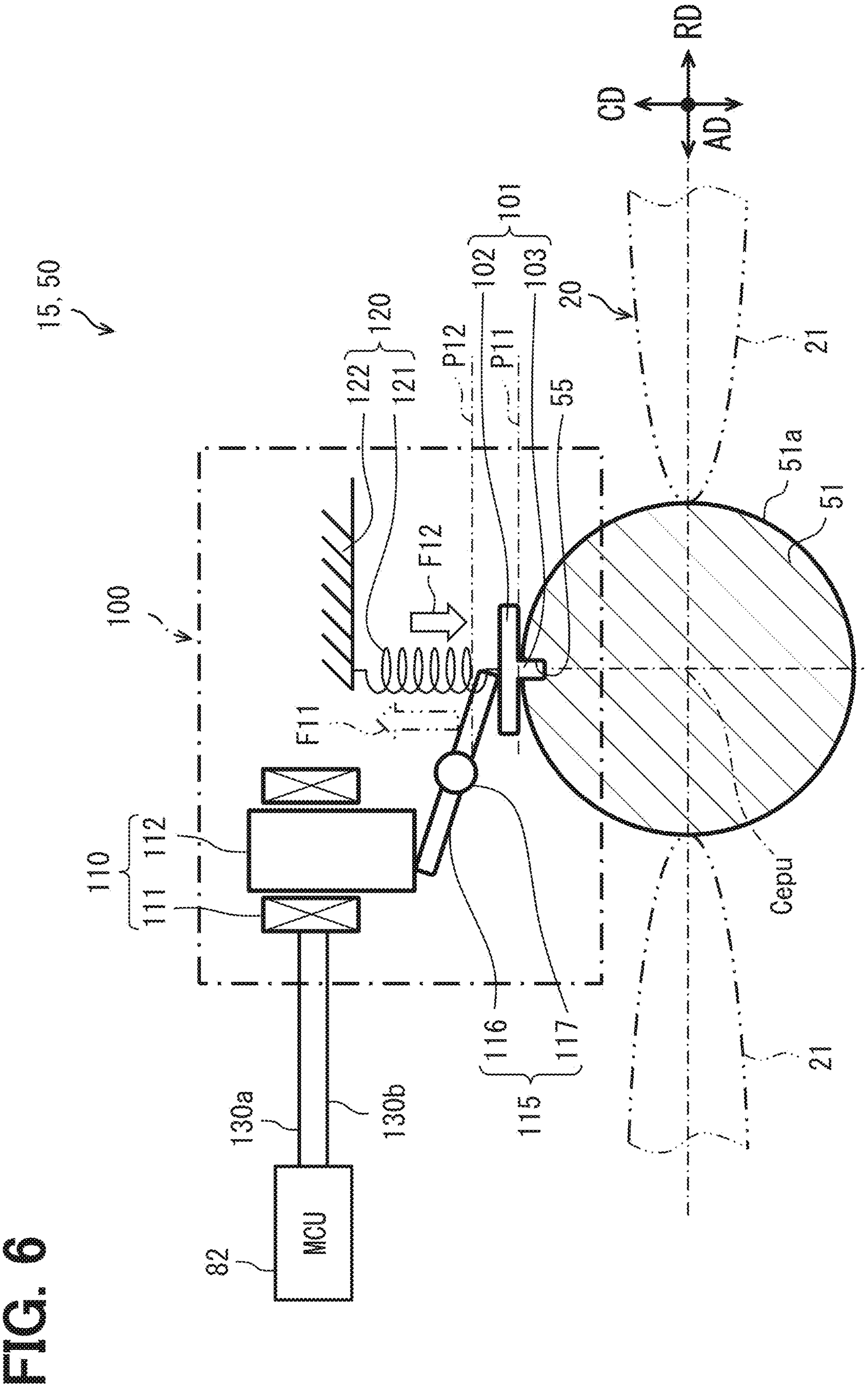
FIG. 6 is a schematic diagram showing a configuration of a lock device in a locked state.

As shown in FIG. 6, the lock device 100 includes a lock pin 101, a solenoid 110, a pressing force transmission portion 115, and a pressing unit 120. The lock pin 101 restricts the rotation of the propeller 20 when being caught in the EPU shaft 51. That is, the lock pin 101 can lock the propeller 20. The lock pin 101 corresponds to a restriction member.

The lock pin 101 is movable between a locked position P11 and an unlocked position P12. The lock pin 101 locks the propeller 20 at the locked position P11. When being at the locked position P11, the lock pin 101 is caught in a shaft groove 55 of the EPU shaft 51 to restrict the rotation of the propeller 20. The lock pin 101 does not lock the propeller 20 when being at the unlocked position P12. When being at the unlocked position P12, the lock pin 101 is not caught in the shaft groove 55 and permits the rotation of the propeller 20. The locked position P11 corresponds to a restriction position, and the unlocked position P12 corresponds to a permission position.

The shaft groove 55 is provided in the EPU shaft 51. The shaft groove 55 is a groove-shaped recess provided in a shaft outer circumferential surface 51*a*. The shaft outer circumferential surface 51*a* is an outer circumferential surface of the EPU shaft 51. The shaft groove 55 is opened toward the radially outer side. The shaft groove 55 extends, for example, in the axial direction AD along the shaft outer circumferential surface 51*a*. A part of the lock pin 101 is caught in the shaft groove 55. For example, a pin portion 103 of the lock pin 101 is caught in the shaft groove 55. The shaft groove 55 receives the lock pin 101. The shaft groove 55 corresponds to a reception portion. Since the pin portion 103 enters the shaft groove 55, the propeller 20 is held at the lock angle. When there is a gap between an inner wall surface of the shaft groove 55 and the pin portion 103, the lock angle has a predetermined angle range.

The lock pin 101 is made of a metal material or the like. The lock pin 101 includes a pin base 102 and the pin portion 103. The pin base 102 is formed in a plate shape and extends, for example, along the shaft outer circumferential surface 51*a*. The pin portion 103 is a protrusion portion provided on a plate surface of the pin base 102. The pin portion 103 protrudes toward the radially inner side from the pin base 102.

The lock pin 101 is movable in the radial direction RD with respect to the EPU shaft 51. The lock pin 101 is movable between the locked position P11 and the unlocked position P12 by moving in the radial direction RD. The lock pin 101 moves from the unlocked position P12 to the locked position P11 by approaching the EPU shaft 51. For the lock pin 101, a position where the pin portion 103 is caught in the shaft groove 55 and the rotation of the propeller 20 is locked is the locked position P11. A position where the pin portion 103 is not caught in the shaft groove 55 and the rotation of the propeller 20 is not locked is the unlocked position P12.

The pressing unit 120 can lock the propeller 20 by mechanical energy. The pressing unit 120 can move the lock pin 101 from the unlocked position P12 to the locked position P11 by mechanical energy. The pressing unit 120 uses a restoring force of an elastic member as the mechanical energy.

The pressing unit 120 includes a pressing member 121 and a pressing support portion 122. The pressing member 121 includes an elastic member such as a spring. The pressing member 121 is elastically deformable as a whole. When the lock pin 101 is at the unlocked position P12, the pressing member 121 is elastically deformed. The pressing member 121 biases the lock pin 101 from the unlocked position P12 toward the locked position P11 by a mechanical pressing force F12 generated as the pressing member 121 is elastically deformed. The mechanical pressing force F12 is a restoring force of the pressing member 121. The mechanical pressing force F12 is a force based on the mechanical energy generated by the pressing member 121. The pressing member 121 presses the lock pin 101 toward the EPU shaft 51 by the mechanical pressing force F12.

The pressing support portion 122 supports the pressing member 121 in a state in which the pressing member 121 is elastically deformable. The pressing support portion 122 is fixed to the motor housing or the like of the EPU 50. The pressing support portion 122 may be a part of the motor housing.

The solenoid 110 can release the lock of the propeller 20 by electric energy. The solenoid 110 can move the lock pin 101 from the locked position P11 to the unlocked position P12 by the electric energy. The solenoid 110 uses electric power supplied from the battery 31 to the solenoid 110 as the electric energy. For example, the electric power of the battery 31 is supplied to the solenoid 110 via the motor control unit 82.

The solenoid 110 includes a solenoid coil 111 and a plunger 112. In the solenoid 110, the plunger 112 is displaced as the solenoid coil 111 is energized. For example, the plunger 112 is movable along a center line of the solenoid coil 111. The plunger 112 biases the lock pin 101 from the locked position P11 toward the unlocked position P12 by an electric pressing force F11 generated as the solenoid coil 111 is energized. The electric pressing force F11 is a force generated by electromagnetic attraction force of the solenoid 110. The electromagnetic attraction force is a force generated as the solenoid 110 is excited. The solenoid 110 is excited by energizing the solenoid coil 111. The electric pressing force F11 is a force based on the electric energy generated as the solenoid coil 111 is energized. The electric pressing force F11 is larger than the mechanical pressing force F12.

Multiple energization paths that allow energization are electrically connected to the solenoid 110. The multiple energization paths include a first parallel path 130*a* and a second parallel path 130*b*. The parallel paths 130*a*, 130*b* electrically connect the motor control unit 82 and the solenoid coil 111. The parallel paths 130*a*, 130*b* include electric wiring such as communication lines. The first parallel path 130*a* and the second parallel path 130*b* are connected in parallel to each other. The motor control unit 82 controls energization of the solenoid coil 111 such that a signal current Is flows through one of the first parallel path 130*a* and the second parallel path 130*b*. The solenoid 110 generates the electric pressing force F11 when the signal current Is flows through the solenoid coil 111.

The solenoid coil 111 may be electrically connected to the battery 31 without passing through the motor control unit 82 as long as a current such as the signal current Is flows through the solenoid coil 111. For example, in a configuration in which energization between the battery 31 and the solenoid coil 111 is interrupted by a predetermined switch, opening and closing of the switch may be controlled by the motor control unit 82.

As the solenoid coil 111 is energized, the solenoid 110 drives the lock pin 101 to move from the locked position P11 to the unlocked position P12. The solenoid coil 111 corresponds to an energization unit, and the solenoid 110 corresponds to an energization drive unit.

The pressing force transmission portion 115 transmits the pressing forces F11, F12 to the lock pin 101. For example, the mechanical pressing force F12 generated by the pressing unit 120 is applied to the lock pin 101 via the pressing force transmission portion 115. The mechanical pressing force F12 is also applied to the solenoid 110 via the pressing force transmission portion 115. The electric pressing force F11 generated by the solenoid 110 is applied to the lock pin 101 via the pressing force transmission portion 115. The electric pressing force F11 is also applied to the pressing unit 120 via the pressing force transmission portion 115.

The pressing force transmission portion 115 includes a transmission plate portion 116 and a transmission shaft portion 117. The transmission plate portion 116 is rotatable with the transmission shaft portion 117 as a rotation axis. The transmission plate portion 116 rotates when the pressing forces F11, F12 are applied. For example, the transmission plate portion 116 transmits the mechanical pressing force F12 to the lock pin 101 and the solenoid 110 by rotating to one side in a circumferential direction of the transmission shaft portion 117. The transmission plate portion 116 applies the electric pressing force F11 to the lock pin 101 and the pressing unit 120 by rotating to the other side in the circumferential direction.

Next, an operation of the lock device 100 will be described.

As shown in FIG. 6, the lock device 100 gets into the locked state when the solenoid coil 111 is not energized. When the solenoid coil 111 is not energized, the solenoid 110 does not generate the electric pressing force F11. That is, the plunger 112 does not bias the lock pin 101 toward the unlocked position P12. In this case, the pressing unit 120 holds the lock pin 101 at the locked position P11 by the mechanical pressing force F12. The mechanical pressing force F12 is a force capable of holding the lock pin 101 at the locked position P11. The mechanical pressing force F12 corresponds to a mechanical restriction force, and the pressing unit 120 corresponds to a mechanical restriction portion.

Figure 7:
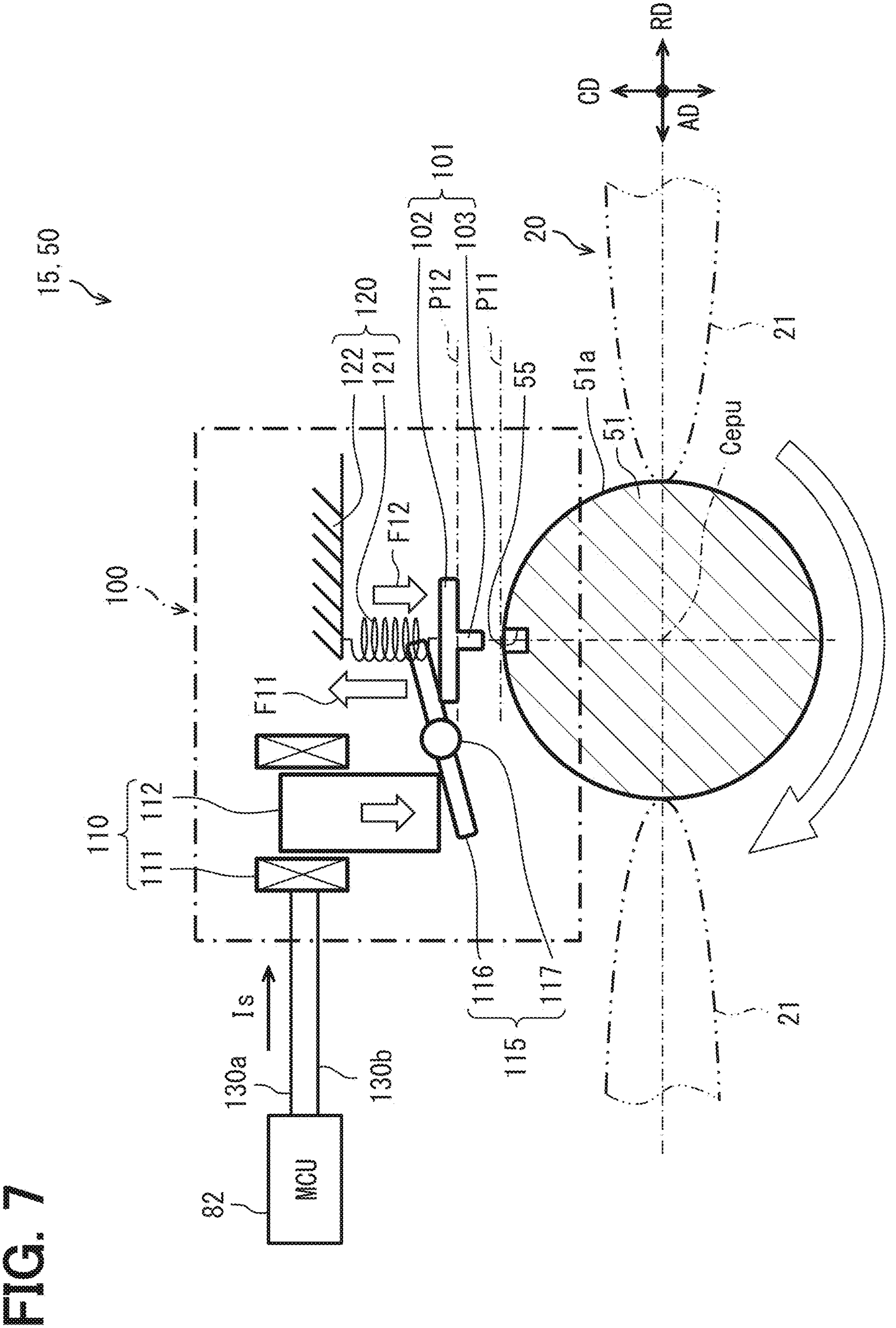
FIG. 7 is a schematic diagram showing a configuration of the lock device in an unlocked state.

As shown in FIG. 7, the lock device 100 is shifted to the unlocked state when the solenoid coil 111 is energized. When the solenoid coil 111 is energized, the solenoid 110 generates the electric pressing force F11. In this case, the plunger 112 moves the lock pin 101 from the locked position P11 to the unlocked position P12 against the mechanical pressing force F12 generated by the pressing unit 120. By continuing the energization of the solenoid coil 111, the plunger 112 holds the lock pin 101 at the unlocked position P12. The plunger 112 corresponds to an energization-based permission portion.

The propulsion control of the propulsion device 15 will be described with reference to a flowchart of FIG. 8. The motor control unit 82 repeatedly executes the propulsion control process at a predetermined control cycle. The motor control unit 82 has a function of executing a process in each step of the propulsion control process.

Figure 8:
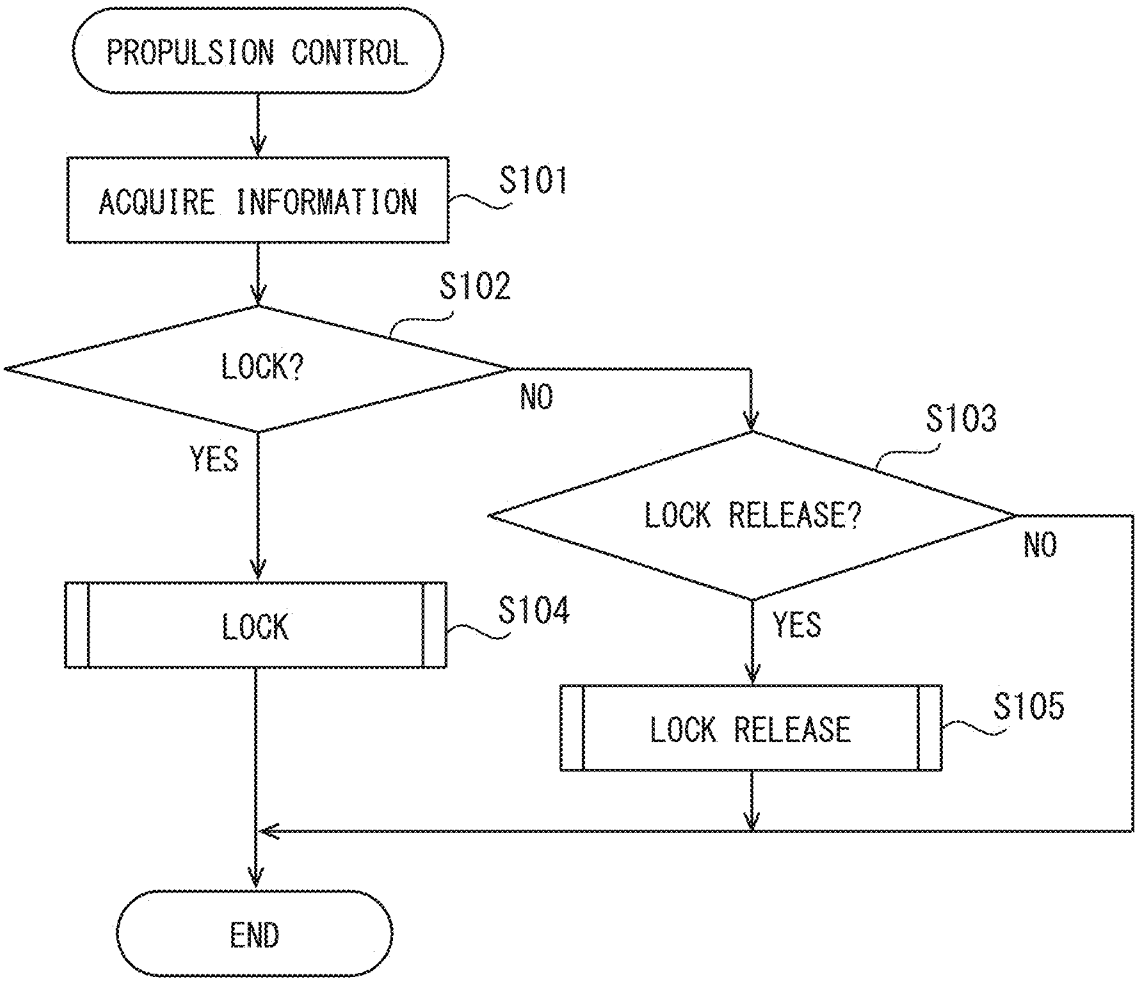
FIG. 8 is a flowchart showing a procedure of a flight control process.

The motor control unit 82 acquires motor information in step S101 shown in FIG. 8. The motor information is information related to a state of the motor 61. The motor information includes a propeller rotation speed. The propeller rotation speed is the rotation speed of the propeller 20. For example, the propeller rotation speed is a rotation speed of the propeller 20 per unit time. The motor control unit 82 acquires the motor information using detection signals of various sensors such as the rotation sensor 52.

In step S102, the motor control unit 82 determines whether to lock the propeller 20. The motor control unit 82 determines whether to lock the propeller 20 according to a flight state, a flight schedule, or the like of the eVTOL 10. For example, when the eVTOL 10 is lifted, if the propeller 20 does not function as a lift-propeller, the motor control unit 82 locks the propeller 20. When the eVTOL 10 is lifted, if the propeller 20 functions as a lift-propeller, the motor control unit 82 does not lock the propeller 20.

When it is determined to lock the propeller 20, the motor control unit 82 proceeds to step S104 and performs a lock process. The lock process is a process for locking the propeller 20. In the lock process, a process for shifting the lock device 100 from the unlocked state to the locked state is performed. The lock process will be described in detail later.

When it is determined not to lock the propeller 20, the motor control unit 82 proceeds to step S103 and determines whether to perform lock release of the propeller 20. In the lock release, the lock device 100 is shifted from the locked state to the unlocked state. The motor control unit 82 determines whether to perform the lock release of the propeller 20 according to a flight state, a flight schedule, or the like of the eVTOL 10. For example, when the eVTOL 10 cruises after being lifted, if the propeller 20 that has been locked instead of functioning as a lift-propeller is used as a cruise-propeller, the lock of the propeller 20 is released.

When it is determined to perform the lock release of the propeller 20, the motor control unit 82 proceeds to step S105 and performs a lock release process. The lock release process is a process for releasing the lock of the propeller 20. In the lock release process, a process for shifting the lock device 100 from the locked state to the unlocked state is performed. The lock release process will be described in detail later.

Next, the lock process will be described with reference to a flowchart of FIG. 9.

Figure 9:
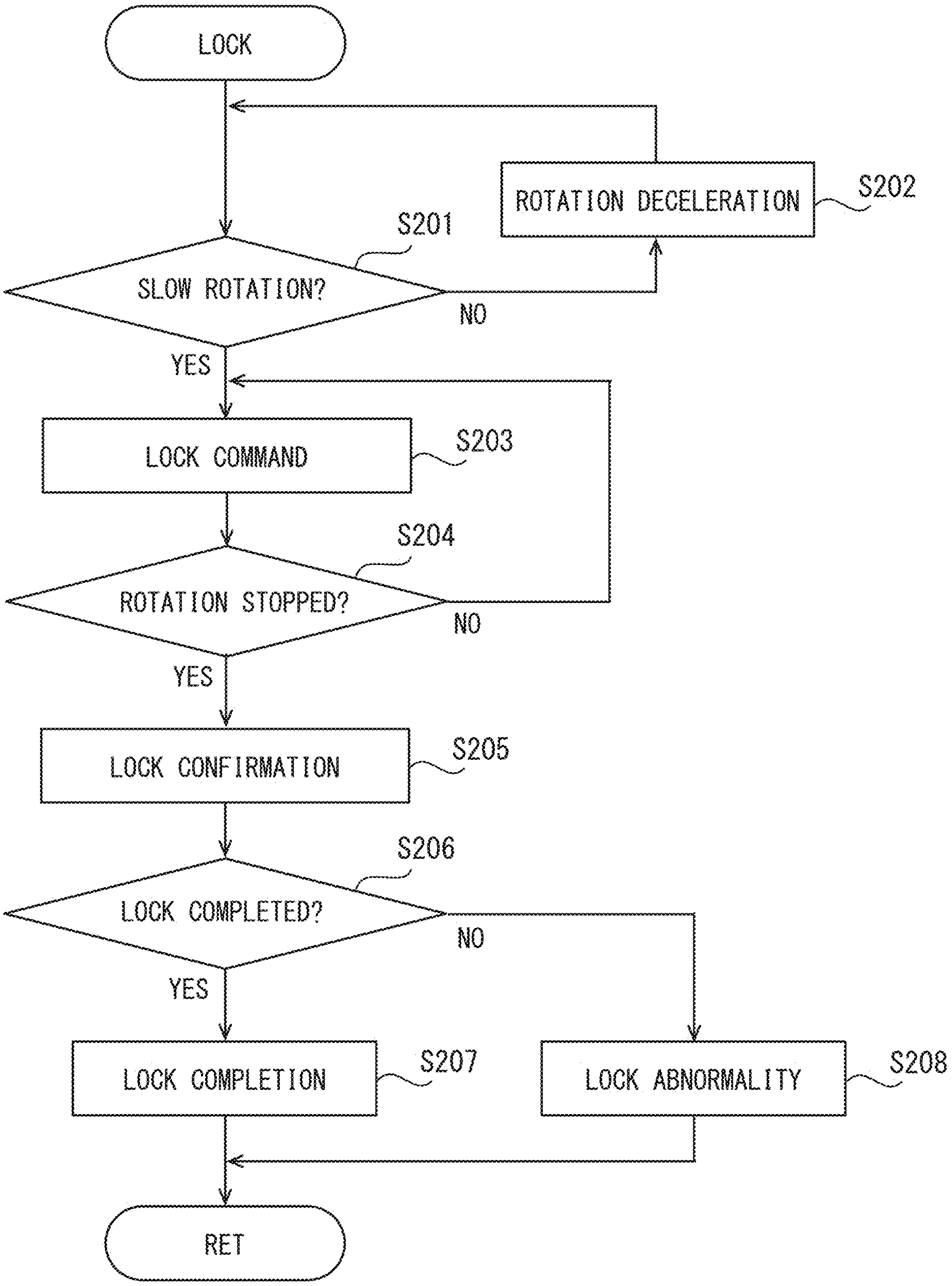
FIG. 9 is a flowchart showing a procedure of a lock process.

In step S201 shown in FIG. 9, the motor control unit 82 determines whether the rotation of the propeller 20 is sufficiently slow. In the determination, it is determined whether the rotation of the propeller 20 is slow enough for the lock pin 101 to get caught in the shaft groove 55. For example, the motor control unit 82 determines whether the propeller rotation speed is smaller than a predetermined threshold. When the propeller rotation speed is smaller than the threshold, the motor control unit 82 determines that the rotation of the propeller 20 is sufficiently slow enough for the lock pin 101 to get caught in the shaft groove 55. On the other hand, when the propeller rotation speed is not smaller than the threshold, the motor control unit 82 determines that the rotation of the propeller 20 is not slow enough for the lock pin 101 to get caught in the shaft groove 55.

When the rotation of the propeller 20 is not sufficiently slow, the motor control unit 82 proceeds to step S202 and performs a rotation deceleration process. The rotation deceleration process is a process for decelerating the rotation of the motor 61 to slow down the rotation of the propeller 20. In the rotation deceleration process, the motor control is performed to slow down the rotation of the motor 61. The processes in steps S201 and S202 are repeated until the rotation of the propeller 20 is sufficiently slow.

When the rotation of the propeller 20 is sufficiently slow, the motor control unit 82 proceeds to step S203 and performs a lock command process. The lock command process is a process for moving the lock pin 101 from the unlocked position P12 to the locked position P11. The lock command process of the present embodiment is a process of interrupting the energization of the solenoid coil 111 such that the signal current Is does not flow to the solenoid coil 111. The motor control unit 82 continues to energize the solenoid coil 111 for a predetermined waiting time. The waiting time is, for example, a time required for the propeller 20 to rotate multiple times. When the lock command process is performed, the pressing unit 120 biases the lock pin 101 toward the locked position P11. The lock command process corresponds to a restriction process. A function of executing the process in step S203 in the motor control unit 82 corresponds to a restriction execution unit.

Figure 10:
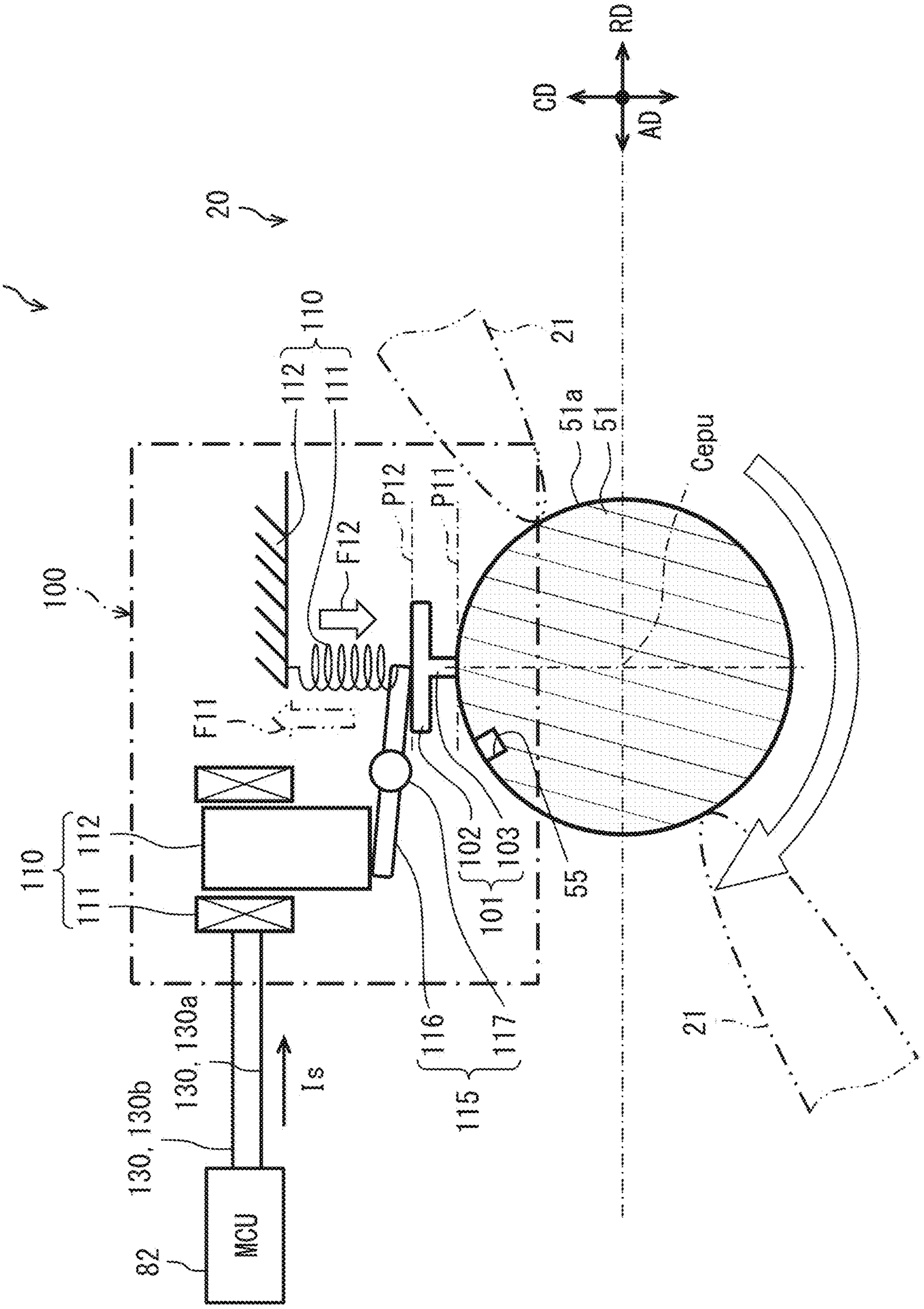
FIG. 10 is a schematic diagram showing a configuration of the lock device in a lock waiting state.

When the energization of the solenoid coil 111 is interrupted, if the shaft groove 55 is at a position facing the pin portion 103, the pin portion 103 enters the shaft groove 55 due to the mechanical pressing force F12. That is, the lock pin 101 is caught in the shaft groove 55. On the other hand, when the shaft groove 55 is not at the position facing the pin portion 103, as shown in FIG. 10, the lock pin 101 is pressed against the shaft outer circumferential surface 51*a* by the mechanical pressing force F12. When the shaft groove 55 moving in the circumferential direction CD reaches the position facing the pin portion 103, the pin portion 103 enters the shaft groove 55 due to the mechanical pressing force F12. That is, the lock pin 101 moves to the locked position P11.

If the rotation of the propeller 20 is not sufficiently slow, even when the shaft groove 55 reaches a position facing the pin portion 103, it is likely that the pin portion 103 cannot enter the shaft groove 55 and the shaft groove 55 passes the pin portion 103. Meanwhile, when the rotation of the propeller 20 is sufficiently slow, it is less likely that the shaft groove 55 passes the pin portion 103 without the pin portion 103 entering the shaft groove 55. That is, the lock pin 101 is easily moved to the locked position P11 by the mechanical pressing force F12.

In step S204, the motor control unit 82 determines whether the rotation of the propeller 20 is stopped. For example, the motor control unit 82 determines whether the propeller rotation speed is zero using the detection signal of the rotation sensor 52. When the propeller rotation speed is zero, the motor control unit 82 determines that the rotation of the propeller 20 is stopped. When the propeller rotation speed is not zero, the motor control unit 82 determines that the rotation of the propeller 20 is not stopped. When the rotation of the propeller 20 is not stopped, the motor control unit 82 repeatedly performs the processes in steps S203 and S204 until the rotation of the propeller 20 is stopped.

When the rotation of the propeller 20 is stopped, the motor control unit 82 proceeds to step S205 and performs a lock confirmation process. Examples of the case where the rotation of the propeller 20 is stopped include a case where the lock pin 101 is moved to the locked position P11 and a case where the lock pin 101 is not moved to the locked position P11. Examples of the case where the lock pin 101 is not moved to the locked position P11 include a case where the rotation of the propeller 20 is stopped due to a frictional force between the pin portion 103 and the shaft outer circumferential surface 51*a* in a state in which the pin portion 103 is pressed against the shaft outer circumferential surface 51*a* due to the mechanical pressing force F12.

The lock confirmation process is a process for confirming that the propeller 20 does not rotate. In the lock confirmation process, on an assumption that the lock pin 101 is moved to the locked position P11, the motor 61 is energized such that a rotational force that does not release the engagement between the lock pin 101 and the shaft groove 55 is generated in the propeller 20. In the lock confirmation process, on an assumption that the lock pin 101 is not moved to the locked position P11, the motor 61 is energized such that a rotational force larger than the frictional force between the pin portion 103 and the shaft outer circumferential surface 51*a* is generated in the propeller 20.

In step S206, the motor control unit 82 determines whether the lock of the propeller 20 is completed. For example, the motor control unit 82 determines whether the lock pin 101 is moved to the locked position P11 by determining whether the propeller 20 rotates. The determination as to whether the propeller 20 rotates includes the determination as to whether the propeller rotation speed is zero. When the propeller 20 does not rotate, the motor control unit 82 determines that the lock pin 101 is moved to the locked position P11 and the lock of the propeller 20 is completed. When the propeller 20 rotates, the motor control unit 82 determines that the lock pin 101 is not moved to the locked position P11 and the lock of the propeller 20 is not completed. A function of executing the process in step S206 in the motor control unit 82 corresponds to a rotation determination unit.

When the lock of the propeller 20 is completed, the motor control unit 82 proceeds to step S207 and performs a lock completion process. In the lock completion process, a process of notifying a pilot or the like that the lock of the propeller 20 is completed is performed.

When the lock of the propeller 20 is not completed, the motor control unit 82 proceeds to step S208 and performs a lock abnormality process. In the lock abnormality process, a process of notifying that the lock of the propeller 20 is not completed is performed. Examples of the case where the lock of the propeller 20 is not completed include a case where an abnormality of the pressing unit 120 or an abnormality of the lock pin 101 occurs. When the lock of the propeller 20 is not completed, the motor control unit 82 may re-execute the processes in steps S201 to S208 at least once.

Figure 11:
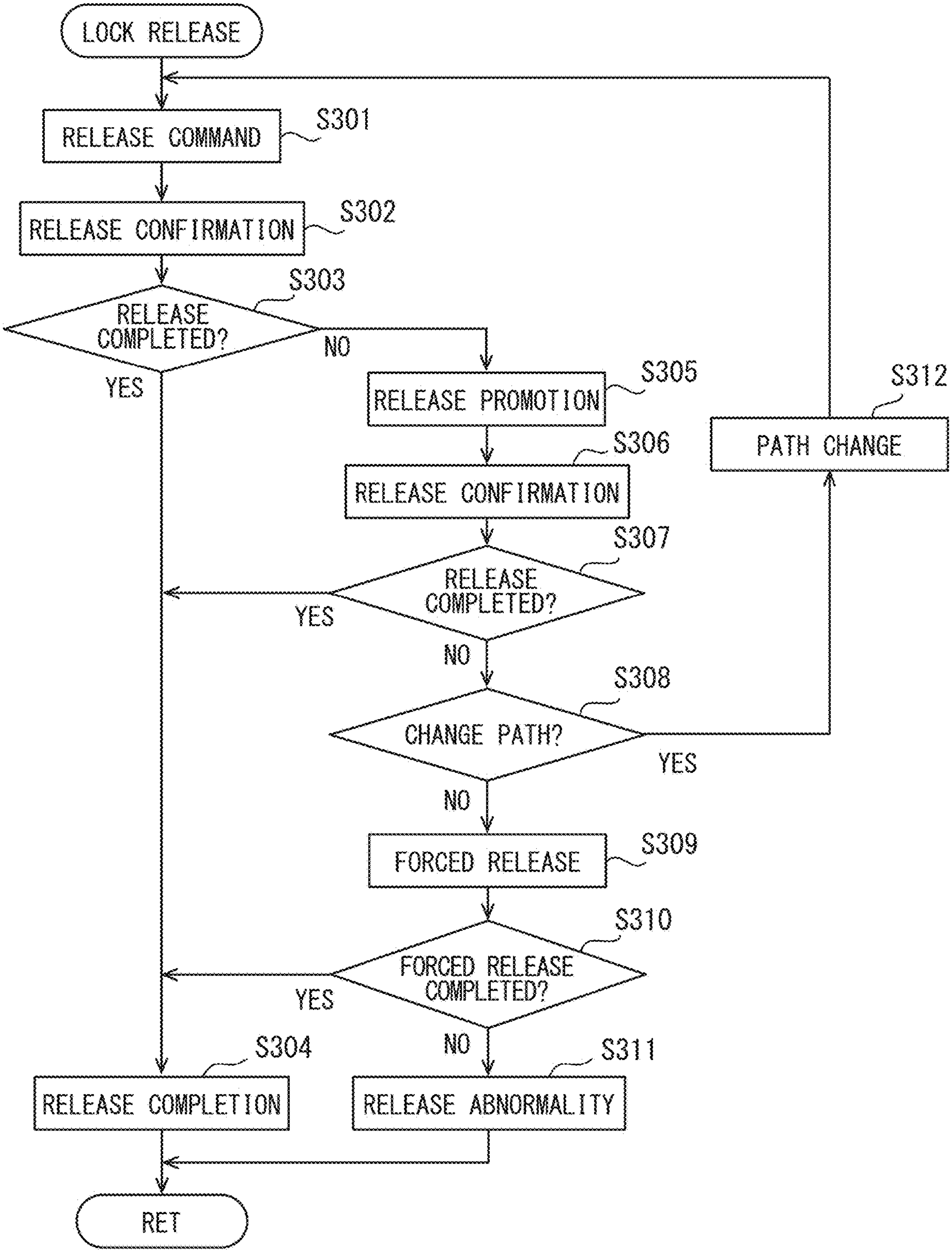
FIG. 11 is a flowchart showing a procedure of a lock release process.

Next, the lock release process will be described with reference to a flowchart of FIG. 11.

In step S301, the motor control unit 82 performs a release command process. The release command process is a process for releasing the lock of the propeller 20. That is, the release command process is a process for moving the lock pin 101 from the locked position P11 to the unlocked position P12. The release command process of the present embodiment is a process of energizing the solenoid coil 111 such that the signal current Is flows through the solenoid coil 111. When the release command process is performed, the solenoid 110 biases the lock pin 101 toward the unlocked position P12. The release command process corresponds to a permission process. A function of executing the process in step S301 in the motor control unit 82 corresponds to a permission execution unit.

In step S302, the motor control unit 82 performs a release confirmation process. The release confirmation process is a process for confirming that the lock of the propeller 20 is released. That is, the release confirmation process is a process for confirming that the lock pin 101 is moved from the locked position P11 to the unlocked position P12. In the release confirmation process, on an assumption that the lock of the propeller 20 is released, the motor 61 is energized such that the propeller 20 rotates. In the release confirmation process, on an assumption that the lock of the propeller 20 is not released, the motor 61 is energized such that a rotational force that does not deform the lock pin 101 is generated in the propeller 20.

In step S303, the motor control unit 82 determines whether the lock release of the propeller 20 is completed. For example, the motor control unit 82 determines whether the lock pin 101 is moved to the unlocked position P12 by determining whether the propeller rotation speed is zero. When the propeller rotation speed is not zero, the motor control unit 82 determines that the lock pin 101 is moved to the unlocked position P12 and the lock release of the propeller 20 is completed. When the propeller rotation speed is zero, the motor control unit 82 determines that the lock pin 101 is not moved to the unlocked position P12 and the lock release of the propeller 20 is not completed.

When the propeller 20 rotates, the motor control unit 82 determines that the lock release of the propeller 20 is completed, and proceeds to step S304 to perform a release completion process. In the release completion process, a process of notifying that the lock release of the propeller 20 is completed is performed.

When the propeller 20 does not rotate, the motor control unit 82 determines that the lock release of the propeller 20 is not completed, and proceeds to step S305 to perform a release promoting process. The release promoting process is a process for facilitating release of the lock of the propeller 20. The motor control unit 82, for example, causes the motor 61 to repeatedly perform a forward rotation and a reverse rotation such that the propeller 20 swings in the circumferential direction CD as the release promoting process. The motor control unit 82 causes the motor 61 to perform the forward rotation and the reverse rotation multiple times such that a rotational force that does not deform the lock pin 101 is generated in the propeller 20. Accordingly, a state in which the lock pin 101 is unintentionally held at the locked position P11 is easily released.

The motor control unit 82 preferably performs the release command process together with the release promoting process. In a state in which the solenoid 110 biases the lock pin 101 toward the unlocked position P12 by the release command process, the propeller 20 is swung in the circumferential direction CD by the release promoting process, and thus the lock pin 101 is easily moved to the unlocked position P12.

In step S306, the motor control unit 82 performs the release confirmation process as in step S302. In step S307, the motor control unit 82 determines whether the lock release of the propeller 20 is completed, as in step S303. When the lock release of the propeller 20 is completed, the motor control unit 82 proceeds to step S304 and performs the release completion process. When the lock of the propeller 20 is released by performing the release promoting process, the motor control unit 82 may notify that the release promoting process is performed in step S304.

When the propeller 20 does not rotate even after the release promoting process is performed, the motor control unit 82 proceeds to step S308. In step S308, the motor control unit 82 determines whether to change an energization path for energizing the solenoid coil 111. In the determination, it is determined whether only one of the first parallel path 130*a* and the second parallel path 130*b* is used for energizing the solenoid coil 111. When only one of the parallel paths 130*a*, 130*b* is used for energization, the motor control unit 82 changes the energization path and proceeds to step S312.

Examples of the case where the lock of the propeller 20 is not released include a case where the solenoid coil 111 is not energized due to occurrence of an abnormality such as disconnection in the parallel paths 130*a*, 130*b*. For example, when an abnormality occurs in the first parallel path 130*a*, the signal current Is that the motor control unit 82 causes to flow to the first parallel path 130*a* may not reach the solenoid coil 111. In this case, even if the first parallel path 130*a* is used for energizing the solenoid coil 111, the solenoid 110 does not operate, and thus the lock of the propeller 20 is not completed.

In step S312, the motor control unit 82 performs a path change process. The motor control unit 82 changes the energization path used for energizing the solenoid coil 111 from one of the parallel paths 130*a*, 130*b* to the other. After changing the energization path used for energizing the solenoid coil 111, the motor control unit 82 performs the processes in steps S301 to S307 again. When the lock of the propeller 20 is released after the energization path is changed, the motor control unit 82 may notify that the energization path is changed in the lock completion process of step S304.

Examples of the case where the lock of the propeller 20 is released after the energization path is changed include a case where an abnormality occurs in only one of the parallel paths 130*a*, 130*b*. In this case, no abnormality occurs in the path used for energizing the solenoid coil 111 after the change of the energization path among the parallel paths 130*a*, 130*b*.

On the other hand, examples of a case where the lock of the propeller 20 is not released even if the energization path is changed include a case where an abnormality occurs in both the parallel paths 130*a*, 130*b*. In this case, an abnormality also occurs in the path used for energizing the solenoid coil 111 after the change of the energization path among the parallel paths 130*a*, 130*b*.

When the lock of the propeller 20 is not released even if the energization path is changed, the motor control unit 82 proceeds to step S308 again and determines whether to change the energization path. In this case, assuming that an abnormality occurs in both the parallel paths 130*a*, 130*b*, the motor control unit 82 determines not to change the energization path. When it is determined not to change the energization path, the motor control unit 82 proceeds to step S309.

In step S309, the motor control unit 82 performs a forced release process. The forced release process is a process for forcibly releasing the lock of the propeller 20 implemented by the lock device 100. In the forced release process, for example, the motor 61 is energized such that a rotational force strong enough to deform the lock pin 101 is generated in the propeller 20. In the forced release process, the lock of the propeller 20 implemented by the lock pin 101 is forcibly released by forcibly rotating the EPU shaft 51.

In step S310, the motor control unit 82 determines whether the forced release of the lock of the propeller 20 is completed. For example, the motor control unit 82 determines whether the forced release is completed by determining whether the propeller rotation speed is zero. When the propeller rotation speed is not zero, the motor control unit 82 determines that the forced release is completed. When the propeller rotation speed is zero, the motor control unit 82 determines that the forced release is not completed.

When the forced release is completed, the motor control unit 82 proceeds to step S304 and performs the release completion process. When the lock of the propeller 20 is released by performing the forced release process, the motor control unit 82 may notify that the forced release process is performed in step S304. A notification content may include the deformation of the lock pin 101.

When the forced release is not completed, the motor control unit 82 proceeds to step S311 and performs a release abnormality process. The motor control unit 82 notifies that the lock of the propeller 20 cannot be released due to occurrence of an abnormality in the propulsion device 15, as the release abnormality process. The motor control unit 82 may notify that the abnormality occurring in the propulsion device 15 includes an abnormality in the parallel paths 130*a*, 130*b*, an abnormality in the lock pin 101, or the like.

According to the present embodiment described above, the lock pin 101 is moved from the locked position P11 to the unlocked position P12 as the solenoid coil 111 is energized. In the configuration, by controlling the energization of the motor 61 such that the lock pin 101 is located at the locked position P11, the rotation of the propeller 20 can be restricted by the lock pin 101. Therefore, it is not necessary to energize the motor 61 for a purpose of restricting the rotation of the propeller 20. Accordingly, it is possible to avoid a situation in which the motor 61 continues to consume electric power even though the rotation of the propeller 20 is restricted. Accordingly, the electric power consumed during flying of the eVTOL 10 can be reduced.

In the present embodiment, the lock of the propeller 20 is implemented by a mechanical configuration in which the lock pin 101 is caught in the shaft groove 55. Therefore, an unintentional deviation of the lock angle at which the propeller 20 is locked can be reduced. For example, unlike the present embodiment, in a configuration in which the propeller 20 is locked under drive control of the motor 61, the lock angle of the propeller 20 may be unintentionally deviated.

In a state in which the propeller 20 is locked, a flow of the outside air generated as the propeller 20 rotates is not generated on the outer peripheral side of the EPU 50, and an effect of cooling the EPU 50 by the outside air is low. Meanwhile, for example, in the configuration in which the propeller 20 is locked under the drive control of the motor 61, the effect of cooling the EPU 50 by the outside air is low although heat is generated in the motor device 60 as the motor 61 is energized. That is, in the configuration, a temperature of the motor 61 may be excessively high even though the motor 61 does not drive the propeller 20 to rotate. Meanwhile, according to the present embodiment, since the mechanical lock of the propeller 20 is performed by the lock device 100, even if the air cooling based on the rotation of the propeller 20 is stopped, the temperature of the motor 61 is less likely to be excessively high.

According to the present embodiment, in a state in which the solenoid coil 111 is not energized, the pressing unit 120 holds the lock pin 101 at the locked position P11 by the mechanical energy. Therefore, in a state in which the propeller 20 is locked, the electric power consumed by the solenoid coil 111 can be reduced. For example, among the multiple propellers 20, in the propeller 20 whose locked state continues for a long time, an effect of reducing the electric power consumed by the solenoid coil 111 is enhanced. Since the propeller 20 is locked by the mechanical energy, even if the air cooling based on the rotation of the propeller 20 is stopped, the temperature of the motor device 60 is less likely to be increased.

According to the present embodiment, by energizing the solenoid coil 111, the plunger 112 moves the lock pin 101 to the unlocked position P12 against the mechanical pressing force F12. In the configuration, the lock of the propeller 20 can be released by the electric pressing force F11 generated as the solenoid coil 111 is energized. Therefore, in the lock device 100, the lock and the lock release of the propeller 20 can be performed using both the mechanical energy and the electric energy.

Multiple energization paths such as the parallel paths 130*a*, 130*b* are connected to the solenoid coil 111. In the configuration, even if an abnormality occurs in one of the energization paths, the solenoid coil 111 can be energized through the remaining energization path. Therefore, it is possible to solve a problem that the solenoid coil 111 cannot be energized and the lock of the propeller 20 cannot be released. Accordingly, it is possible to avoid decrease in safety of the eVTOL 10 caused by a fact that the lock of the propeller 20 cannot be released. For example, when the lock of the propeller 20 cannot be released, the thrust and lift of the eVTOL 10 may be insufficient by an amount corresponding to a fact that the propeller 20 cannot be driven to rotate.

According to the present embodiment, by continuing the energization of the solenoid coil 111, the plunger 112 holds the lock pin 101 at the unlocked position P12. In the configuration, the lock pin 101 is less likely to unintentionally move from the unlocked position P12 to the locked position P11. For example, even if disturbance such as noise is applied to the signal current Is flowing through the solenoid coil 111, the signal current Is is less likely to unintentionally become zero. Therefore, a situation in which the signal current Is unintentionally becomes zero and the propeller 20 is locked can be reduced. Accordingly, unintentional lock of the propeller 20 and a decrease in the safety of the eVTOL 10 can be reduced.

According to the present embodiment, the motor control unit 82 can move the lock pin 101 between the locked position P11 and the unlocked position P12 by controlling the energization of the solenoid coil 111. In the configuration, since a pilot does not need to manually operate a sequence for locking the propeller 20, a work load in operating the eVTOL 10 can be reduced. The motor control unit 82 can move the lock pin 101 to the unlocked position P12 by controlling the energization of the solenoid coil 111. In the configuration, since a pilot does not need to perform a manual operation for releasing the lock of the propeller 20, a work load in operating the eVTOL 10 can be reduced.

According to the present embodiment, the motor control unit 82 performs a process for moving the lock pin 101 to the locked position P11 when the propeller rotation speed is lower than the threshold. In the configuration, the lock pin 101 can be caught in the shaft groove 55 in a state in which the rotation of the propeller 20 is sufficiently slow. Therefore, a state in which the lock pin 101 is not caught in the shaft groove 55 continuing for a long time, the deformation of the lock pin 101, and the like can be reduced. Accordingly, a time required to lock the propeller 20 can be shortened and occurrence of an abnormality in the lock pin 101 can be reduced.

According to the present embodiment, the motor control unit 82 determines whether the propeller 20 rotates when the process for moving the lock pin 101 to the locked position P11 is performed. In the configuration, it is determined whether the propeller 20 is locked by determining whether the propeller 20 rotates. Therefore, it is possible to confirm that the propeller 20 is normally locked by the lock device 100.

Second Embodiment

In the first embodiment, the propeller 20 is locked when the solenoid coil 111 is not energized. Meanwhile, in a second embodiment, the lock of the propeller 20 is released when the solenoid coil 111 is not energized. Configurations, operations, and effects not particularly described in the second embodiment are the same as those in the first embodiment described above. In the second embodiment, differences from the first embodiment will be mainly described.

Figure 12:
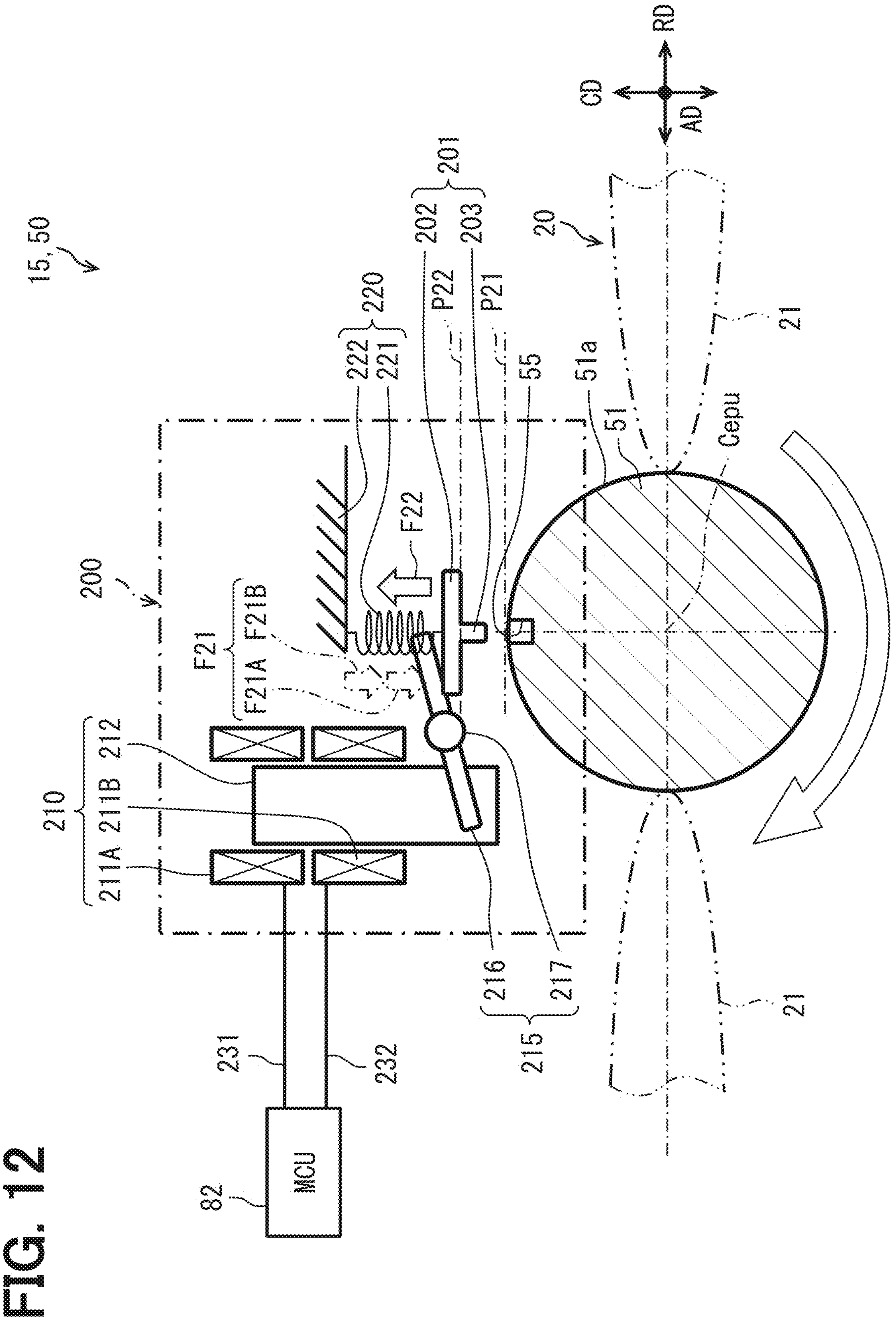
FIG. 12 is a schematic diagram showing a configuration of a lock device in an unlocked state according to a second embodiment.

As shown in FIG. 12, the propulsion device 15 includes a lock device 200. The lock device 200 is a device corresponding to the lock device 100 of the first embodiment, and is capable of locking the propeller 20 similarly to the lock device 100.

The lock device 200 includes members and portions corresponding to those of the lock device 100. The lock device 200 includes a lock pin 201, a solenoid 210, a pressing force transmission portion 215, and a pressing unit 220. The lock pin 201 corresponds to the restriction member. The lock pin 201 is movable between a locked position P21 and an unlocked position P22. When being at the locked position P21, the lock pin 201 is caught in the shaft groove 55 to restrict the rotation of the propeller 20. The locked position P21 corresponds to the restriction position, and the unlocked position P22 corresponds to the permission position. The lock pin 201 includes a pin base 202 and a pin portion 203.

The pressing unit 220 can release the lock of the propeller 20 by mechanical energy. The pressing unit 220 can move the lock pin 201 from the locked position P21 to the unlocked position P22 by the mechanical energy. The pressing unit 220 includes a pressing member 221 and a pressing support portion 222. In contrast to the pressing member 121 of the first embodiment, the pressing member 221 is elastically deformed when the lock pin 201 is at the locked position P21. The pressing member 221 biases the lock pin 201 from the locked position P21 toward the unlocked position P22 by a mechanical pressing force F22 generated as the pressing member 221 is elastically deformed. The mechanical pressing force F22 acts in a direction opposite to the mechanical pressing force F12 of the first embodiment. The mechanical pressing force F22 is a force based on the mechanical energy generated by the pressing member 221.

The solenoid 210 can lock the propeller 20 by electric energy. The solenoid 210 can move the lock pin 201 from the unlocked position P22 to the locked position P21 by the electric energy.

The solenoid 210 includes solenoid coils 211A, 211B and a plunger 212. The plunger 212 biases the lock pin 201 from the unlocked position P22 toward the locked position P21 by an electric pressing force F21 generated as the solenoid coils 211A, 211B are energized. The electric pressing force F21 is a force based on the electric energy generated as the solenoid coils 211A, 211B are energized. The electric pressing force F21 is larger than the mechanical pressing force F22.

As the solenoid coils 211A, 211B are energized, the solenoid 210 drives the lock pin 201 to move from the unlocked position P22 to the locked position P21. The solenoid coils 211A, 211B correspond to the energization unit, and the solenoid 210 corresponds to the energization drive unit.

In the first embodiment, the energization drive unit includes one energization unit, whereas in the present embodiment, the energization drive unit includes multiple energization units. In the present embodiment, the solenoid 210 corresponds to the energization drive unit, and the solenoid coils 211A, 211B correspond to the energization unit. In the solenoid 210, the first solenoid coil 211A and the second solenoid coil 211B are arranged along the plunger 212. The first solenoid coil 211A and the second solenoid coil 211B are energized independently of each other.

In the solenoid 210, a first electric pressing force F21A is generated as the first solenoid coil 211A is energized. A second electric pressing force F21B is generated as the second solenoid coil 211B is energized. Each of the first electric pressing force F21A and the second electric pressing force F21B is smaller than the mechanical pressing force F22. The electric pressing force F21 includes the first electric pressing force F21A and the second electric pressing force F21B. For example, the electric pressing force F21 is a sum of the first electric pressing force F21A and the second electric pressing force F21B. The first electric pressing force F21A and the second electric pressing force F21B correspond to a single restriction force.

Multiple energization paths that allow energization are electrically connected to the solenoid 210. The multiple energization paths include a first coil path 231 and a second coil path 232. The first coil path 231 electrically connects the motor control unit 82 and the first solenoid coil 211A. The second coil path 232 is electrically connected to the motor control unit 82 and the second solenoid coil 211B. The coil paths 231, 232 include electric wiring such as communication lines.

Figure 13:
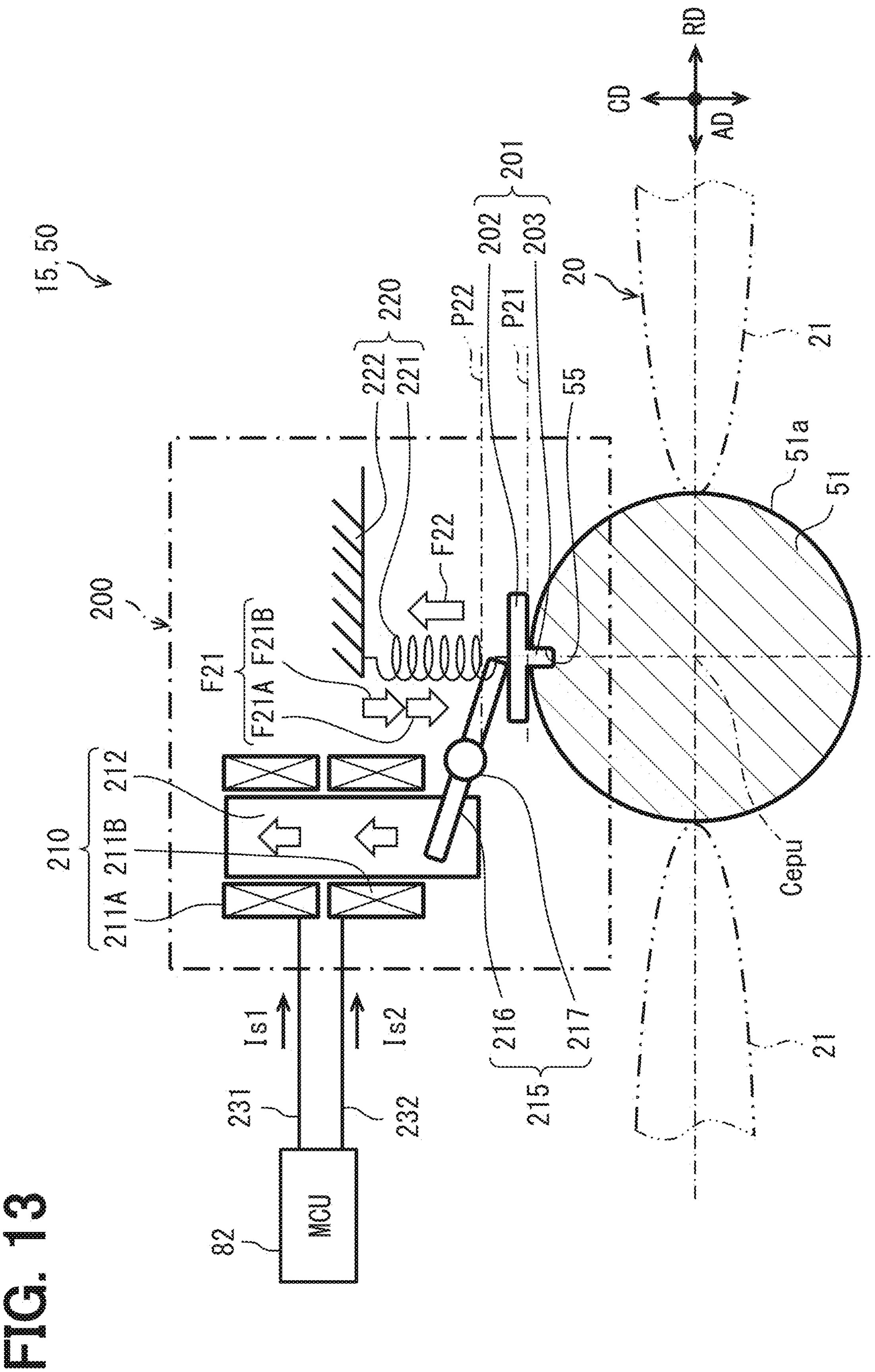
FIG. 13 is a schematic diagram showing a configuration of the lock device in a locked state.

As shown in FIG. 13, the motor control unit 82 controls energization of the first solenoid coil 211A such that a first signal current Is1 flows through the first coil path 231. The first solenoid coil 211A generates the first electric pressing force F21A when the first signal current Is1 flows therethrough. The motor control unit 82 controls energization of the second solenoid coil 211B such that a second signal current Is2 flows through the second coil path 232. The second solenoid coil 211B generates the second electric pressing force F21B when the second signal current Is2 flows therethrough.

The pressing force transmission portion 215 transmits the pressing forces F21, F22 to the lock pin 201. The pressing force transmission portion 215 includes a transmission plate portion 216 and a transmission shaft portion 217.

Next, an operation of the lock device 200 will be described.

As shown in FIG. 12, the lock device 200 is at the unlocked state when the solenoid coils 211A, 211B are not energized. When the solenoid coils 211A, 211B are not energized, the electric pressing force F21 is not generated in the solenoid 210. That is, the plunger 212 does not bias the lock pin 201 toward the locked position P21. In this case, the pressing unit 220 holds the lock pin 201 at the unlocked position P22 by the mechanical pressing force F22. The mechanical pressing force F22 is a force capable of holding the lock pin 201 at the unlocked position P22. The mechanical pressing force F22 corresponds to a mechanical permission force, and the pressing unit 220 corresponds to a mechanical permission portion.

As shown in FIG. 13, the lock device 200 is shifted to the locked state when the solenoid coils 211A, 211B are energized. When the solenoid coils 211A, 211B are energized, the solenoid 210 generates the electric pressing force F21. That is, the plunger 212 moves the lock pin 201 from the unlocked position P22 to the locked position P21 against the mechanical pressing force F22 generated by the pressing unit 220. By continuing the energization of the solenoid coils 211A, 211B, the plunger 212 holds the lock pin 201 at the locked position P21. The plunger 212 corresponds to an energization-based restriction portion.

Even if only one of the first solenoid coil 211A and the second solenoid coil 211B is energized, the lock device 200 is not shifted to the locked state. For example, when only the first solenoid coil 211A is energized, the solenoid 210 generates the first electric pressing force F21A. The first electric pressing force F21A is smaller than the mechanical pressing force F22. Therefore, the first electric pressing force F21A alone does not cause the plunger 212 to move the lock pin 201 to the locked position P21 against the mechanical pressing force F22.

According to the present embodiment, by continuing the energization of the solenoid coils 211A, 211B, the solenoid 210 holds the lock pin 201 at the locked position P21. In the configuration, the lock of the propeller 20 can be managed by managing the energization of the solenoid coils 211A, 211B. Therefore, a situation in which the propeller 20 is unintentionally locked by the lock pin 201 is less likely to occur. Accordingly, unintentional lock of the propeller 20 and a decrease in the safety of the eVTOL 10 can be reduced.

According to the present embodiment, as the multiple solenoid coils 211A, 211B are energized, the plunger 212 moves the lock pin 201 from the unlocked position P22 to the locked position P21 against the mechanical pressing force F22 generated by the pressing unit 220. In the configuration, when the energization of the solenoid coils 211A, 211B are unintentionally interrupted, the lock pin 201 is likely to return to the unlocked position P22 due to the mechanical pressing force F22. For example, it is possible to avoid a situation in which the lock of the propeller 20 cannot be released when the electric power supplied to the solenoid coils 211A, 211B is unintentionally cut off. Therefore, the decrease in the safety of the eVTOL 10 due to the fact that the lock of the propeller 20 cannot be released can be reduced.

In the configuration, the propeller 20 can be locked as long as the electric pressing force F21 generated as the solenoid coils 211A, 211B are energized is larger than the mechanical pressing force F22. Therefore, for example, as compared with the configuration in which the propeller 20 is locked under the drive control of the motor 61, power consumption required to lock the propeller 20 can be reduced. Accordingly, energy saving of the eVTOL 10 can be achieved.

According to the present embodiment, the first electric pressing force F21A generated by energizing the first solenoid coil 211A is smaller than the mechanical pressing force F22 generated by the pressing unit 220. Similarly, the second electric pressing force F21B generated by energizing the second solenoid coil 211B is smaller than the mechanical pressing force F22. In these configurations, even if only one of the first solenoid coil 211A and the second solenoid coil 211B is energized, the propeller 20 is not locked. Therefore, for example, even if disturbance such as noise is applied to the solenoid coils 211A, 211B, it is less likely that both the solenoid coils 211A, 211B are excited and the electric pressing force F21 becomes larger than the mechanical pressing force F22. For example, even if the first solenoid coil 211A is excited due to disturbance, the electric pressing force F21 including only the first electric pressing force F21A does not become larger than the mechanical pressing force F22 unless the second solenoid coil 211B is excited. Accordingly, the solenoid coils 211A, 211B can reduce the unintentional lock of the propeller 20.

Third Embodiment

In a third embodiment, multiple lock angles at which the propeller 20 can be locked are provided. Configurations, operations, and effects not particularly described in the third embodiment are the same as those in the first embodiment. In the third embodiment, differences from the first embodiment will be mainly described.

Figure 14:
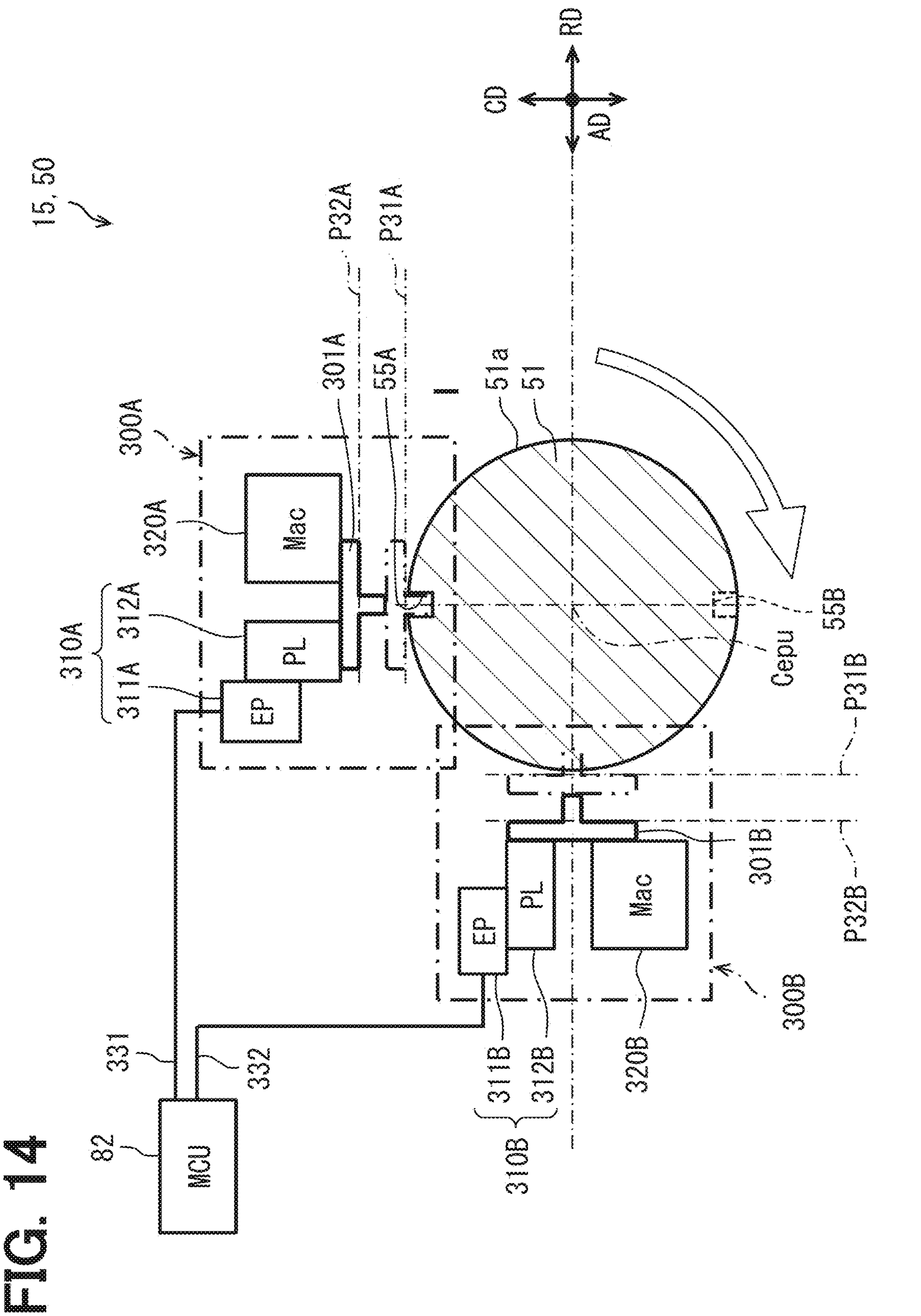
FIG. 14 is a schematic diagram showing a configuration of a lock device according to a third embodiment.

In the first embodiment, one restriction member is provided, whereas multiple restriction members are provided in the present embodiment. The multiple restriction members are located at different positions in at least one of the circumferential direction CD and the axial direction AD. For example, as shown in FIG. 14, a first lock pin 301A and a second lock pin 301B are arranged in the circumferential direction CD as the restriction members. The first lock pin 301A and the second lock pin 301B can lock the propeller 20 at different lock angles. The first lock pin 301A and the second lock pin 301B are arranged in the circumferential direction CD. The second lock pin 301B is provided at a position different from that of the first lock pin 301A in the circumferential direction CD. The first lock pin 301A corresponds to a first restriction member, and the second lock pin 301B corresponds to a second restriction member.

The propulsion device 15 includes a first lock device 300A and a second lock device 300B. The lock devices 300A, 300B are devices corresponding to the lock device 100 of the first embodiment, and can lock the propeller 20 similarly to the lock device 100.

Each of the lock devices 300A, 300B includes members and portions corresponding to those of the lock device 100. The first lock device 300A includes a first solenoid 310A and a first pressing unit 320A in addition to a first lock pin 301A. The first lock pin 301A is movable between a first locked position P31A and a first unlocked position P32A. When being at the first locked position P31A, the first lock pin 301A is caught in a first shaft groove 55A to restrict the rotation of the propeller 20. When the first lock pin 301A is at the first locked position P31A, a part of the first lock pin 301A is caught in the first shaft groove 55A. The first locked position P31A corresponds to the restriction position, and the first unlocked position P32A corresponds to the permission position.

The first solenoid 310A includes a first solenoid coil 311A and a first plunger 312A. As the first solenoid coil 311A is energized, the first plunger 312A generates a force that biases the first lock pin 301A. The first solenoid coil 311A is energized to move the first lock pin 301A from one of the first locked position P31A and the first unlocked position P32A to the other. The first solenoid 310A corresponds to an energization drive unit and may be referred to as a first energization drive unit. The first solenoid coil 311A corresponds to the energization unit and a first energization unit.

The first lock device 300A is configured to displace the first lock pin 301A by controlling energization of the first solenoid coil 311A. The first lock device 300A may be of a type in which the lock of the propeller 20 is released by the electric energy against the mechanical energy, or a type in which the propeller 20 is locked by the electric energy against the mechanical energy. As one of the type in which the lock of the propeller 20 is released by the electric energy against the mechanical energy, there is the lock device 100 of the first embodiment described above. As one of the type in which the propeller 20 is locked by the electric energy against the mechanical energy, there is the lock device 200 of the second embodiment described above.

The second lock device 300B includes a solenoid 310B and a pressing unit 320B in addition to a second lock pin 301B. The second lock pin 301B is movable between a second locked position P31B and a second unlocked position P32B. When being at the second locked position P31B, the second lock pin 301B is caught in a second shaft groove 55B to restrict the rotation of the propeller 20. A part of the second lock pin 301B is caught in the second shaft groove 55B. The second locked position P31B corresponds to the restriction position, and the second unlocked position P32B corresponds to the permission position.

The second solenoid 310B includes a second solenoid coil 311B and a second plunger 312B. As the second solenoid coil 311B is energized, the second plunger 312B generates a force that biases the second lock pin 301B. The second solenoid coil 311B is energized to move the second lock pin 301B from one of the second locked position P31B and the second unlocked position P32B to the other. The second solenoid 310B corresponds to the energization drive unit and may be referred to as a second energization drive unit. The second solenoid coil 311B corresponds to the energization unit and a second energization unit.

The second lock device 300B is configured to displace the second lock pin 301B by controlling energization of the second solenoid coil 311B. Similarly to the first lock device 300A, the second lock device 300B may be of a type in which the lock of the propeller 20 is released by the electric energy against the mechanical energy, or a type in which the propeller 20 is locked by the electric energy against the mechanical energy.

The first shaft groove 55A and the second shaft groove 55B are provided in the EPU shaft 51. The first shaft groove 55A and the second shaft groove 55B are provided at least at different positions in the axial direction AD among the circumferential direction CD and the axial direction AD. For example, as shown in FIG. 14, the first shaft groove 55A and the second shaft groove 55B are located at different positions in both the circumferential direction CD and the axial direction AD. Since the first shaft groove 55A and the second shaft groove 55B are separated from each other in the axial direction AD, the second lock pin 301B is prevented from being caught in the first shaft groove 55A and the first lock pin 301A is prevented from being caught in the second shaft groove 55B. The first shaft groove 55A corresponds to the reception portion and may be referred to as a first reception portion. The second shaft groove 55B corresponds to the reception portion and may be referred to as a second reception portion.

The first lock device 300A and the second lock device 300B can lock the propeller 20 at different lock angles. The first lock device 300A can lock the propeller 20 at a first lock angle. The second lock device 300B can lock the propeller 20 at a second lock angle. The first lock angle and the second lock angle have a difference of 90 degrees in the circumferential direction CD, for example.

In FIG. 14, the solenoid coils 311A, 311B are illustrated as EP, the plungers 312A, 312B are illustrated as PL, and the pressing units 320A, 320B are illustrated as Mac. The motor control unit 82 is illustrated as MCU.

In the propulsion control process, the motor control unit 82 selects one of the first lock angle and the second lock angle as the lock angle at which the propeller 20 is locked. When the first lock angle is selected, the motor control unit 82 controls energization of the first solenoid coil 311A such that the first lock device 300A is shifted to the locked state. When the second lock angle is selected, the motor control unit 82 controls energization of the second solenoid coil 311B such that the second lock device 300B is shifted to the locked state.

According to the present embodiment, in the first solenoid 310A, the first solenoid coil 311A is energized to move the first lock pin 301A from one of the first locked position P31A and the first unlocked position P32A to the other. In the second solenoid 310B, the second solenoid coil 311B is energized to move the second lock pin 301B from one of the second locked position P31B and the second unlocked position P32B to the other. Therefore, the lock angle of the propeller 20 can be changed by selectively switching an energization target between the first solenoid coil 311A and the second solenoid coil 311B. Accordingly, the energy saving of the eVTOL 10 can be achieved by changing the lock angle of the propeller 20 according to a flight state of the eVTOL 10 or the like.

Fourth Embodiment

In a fourth embodiment, the restriction member such as the lock pin 101 is configured to promote the lock release of the propeller 20. Configurations, operations, and effects not particularly described in the fourth embodiment are the same as those in the first embodiment. In the fourth embodiment, differences from the first embodiment will be mainly described.

The lock pin 101 is shaped to be easily movable from the locked position P11 to the unlocked position P12. That is, the lock pin 101 is shaped such that the engagement between the lock pin 101 and the shaft groove 55 is easily released as the lock pin 101 is moved to the unlocked position P12. In the lock pin 101, the pin portion 103 has a tapered shape. In the pin portion 103, for example, a width dimension in the radial direction RD decreases as a distance from the pin base 102 increases. In the pin portion 103, a width dimension of a tip end portion is smallest.

Figure 15:
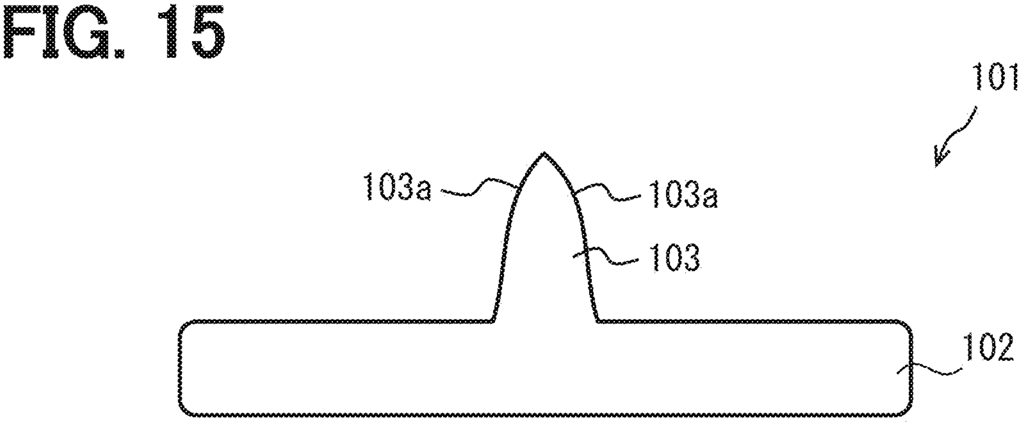
FIG. 15 is a diagram showing a configuration of a lock pin according to a fourth embodiment.

As shown in FIG. 15, the pin portion 103 has tapered surfaces 103*a*. The tapered surfaces 103*a* are contained in an outer surface of the pin portion 103. The tapered surfaces 103*a* are provided in a pair so as to be arranged with the tip end portion of the pin portion 103 interposed therebetween. The pair of tapered surfaces 103*a* are arranged in the radial direction RD, for example. Each of the tapered surfaces 103*a* is inclined in a tapered shape with respect to a center line of the pin portion 103. The tapered surface 103*a* is inclined with respect to the inner wall surface of the shaft groove 55. Therefore, in a state in which the pin portion 103 enters the shaft groove 55, a partial gap is likely to be formed between the tapered surface 103*a* and the inner wall surface of the shaft groove 55.

When the motor control unit 82 performs the release promoting process in a state in which the lock pin 101 is at the locked position P11, the pin portion 103 easily comes out of the shaft groove 55. For example, when the motor control unit 82 swings the propeller 20 and the EPU shaft 51 in the circumferential direction CD, the tapered surface 103*a* easily slides along the inner wall surface of the shaft groove 55. Therefore, the pin portion 103 easily comes out of the shaft groove 55, and the state in which the lock pin 101 and the shaft groove 55 are caught together is easily released. The tapered surface 103*a* promotes the release of the state in which the lock pin 101 and the shaft groove 55 are caught together. The tapered surface 103*a* corresponds to a release promoting portion.

According to the present embodiment, in the lock pin 101, the release of the state in which the lock pin 101 and the shaft groove 55 are caught together is promoted by the tapered surface 103*a*. In the configuration, the tapered surface 103*a* can reduce a situation in which the state in which the lock pin 101 and the shaft groove 55 are caught together cannot be released. Therefore, a situation in which the lock of the propeller 20 is unintentionally held can be solved by the tapered surface 103*a*.

Fifth Embodiment

In a fifth embodiment, the restriction member such as the lock pin 101 is configured to easily forcibly release the lock of the propeller 20. Configurations, operations, and effects not particularly described in the fifth embodiment are the same as those of the first embodiment. In the fifth embodiment, differences from the first embodiment will be mainly described.

The lock pin 101 is configured to be easily deformed locally. When the motor control unit 82 performs the forced release process and a rotational force strong enough to deform the lock pin 101 is generated in the propeller 20, the lock pin 101 is locally deformed, and thus the lock of the propeller 20 is easily forcibly released.

Figure 16:
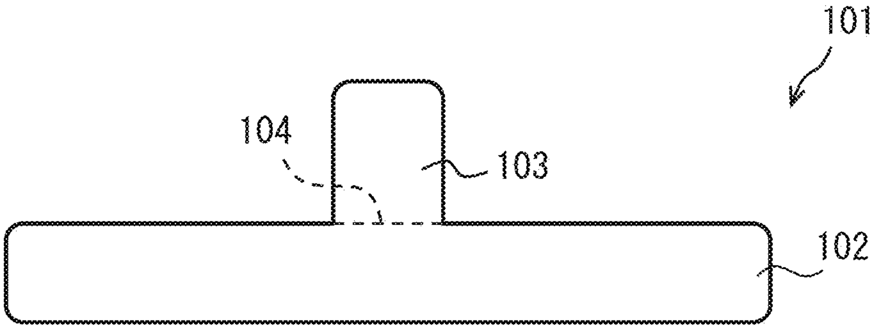
FIG. 16 is a diagram showing a configuration of a lock pin according to a fifth embodiment.

As shown in FIG. 16, the lock pin 101 includes a fragile portion 104. The fragile portion 104 is a portion that is locally fragile in the lock pin 101. The fragile portion 104 is a portion that is easily deformed due to low strength or the like as compared with other portions of the lock pin 101. The fragile portion 104 is provided, for example, at a boundary portion between the pin base 102 and the pin portion 103. The fragile portion 104 extends along the boundary portion between the pin base 102 and the pin portion 103. In the lock pin 101, when an external force is applied to the pin portion 103, the fragile portion 104 is easily deformed. For example, deformation of the fragile portion 104 facilitates detachment of the pin portion 103 from the pin base 102.

When the motor control unit 82 performs the forced release process, the rotational force is applied to the EPU shaft 51 while the pin portion 103 remains caught in the shaft groove 55. In this case, the rotational force applied on the EPU shaft 51 deforms the fragile portion 104 against the strength of the fragile portion 104. The pin portion 103 is disengaged from the pin base 102 as the fragile portion 104 is deformed, and thus the rotational force rotates the EPU shaft 51. Since the lock pin 101 is easily deformed at the fragile portion 104 in this way, the lock of the propeller 20 is forcibly release easily even if the lock pin 101 is not moved to the unlocked position P12. In other words, the fragile portion 104 promotes the release of the state in which the lock pin 101 and the shaft groove 55 are caught together. The fragile portion 104 corresponds to the release promoting portion.

According to the present embodiment, in the lock pin 101, the release of the state in which the lock pin 101 and the shaft groove 55 are caught together is promoted by the fragile portion 104. In the configuration, the fragile portion 104 can reduce a situation in which the state in which the lock pin 101 and the shaft groove 55 are caught together cannot be released. Therefore, the situation in which the lock of the propeller 20 is unintentionally held can be solved by the fragile portion 104.

Sixth Embodiment

In a sixth embodiment, in each of the forward rotation and the reverse rotation of the propeller 20, it is determined whether the lock of the propeller 20 is completed. Configurations, operations, and effects not particularly described in the sixth embodiment are the same as those in the first embodiment. In the sixth embodiment, differences from the first embodiment will be mainly described.

In the present embodiment, the forward rotation and the reverse rotation of the propeller 20 are possible. The forward rotation of the propeller 20 means that the propeller 20 rotates in a forward direction. For example, the forward direction of the propeller 20 is a direction in the circumferential direction of the propeller axis in which thrust is generated in the eVTOL 10 as the propeller 20 rotates. The reverse rotation of the propeller 20 means that the propeller 20 rotates in a reverse direction. The reverse rotation of the propeller 20 means that the propeller 20 rotates in a direction opposite to the forward rotation. The reverse direction of the propeller 20 is opposite to the forward direction in the circumferential direction of the propeller axis.

The propeller 20 rotates in a direction corresponding to a direction in which the motor 61 rotates. For example, when the motor 61 performs the forward rotation, the propeller 20 also performs the forward rotation. When the motor 61 performs the reverse rotation, the propeller 20 also performs the reverse rotation. The forward rotation of the motor 61 means forward rotation of the motor rotor 64. The reverse rotation of the motor 61 means the reverse rotation of the motor rotor 64. The motor control unit 82 can change a rotational direction of the motor 61 or the propeller 20 by changing an energization direction of the motor stator 63.

The motor control unit 82 performs the lock process as in the first embodiment. The lock process will be described with reference to a flowchart of FIG. 17.

Figure 17:
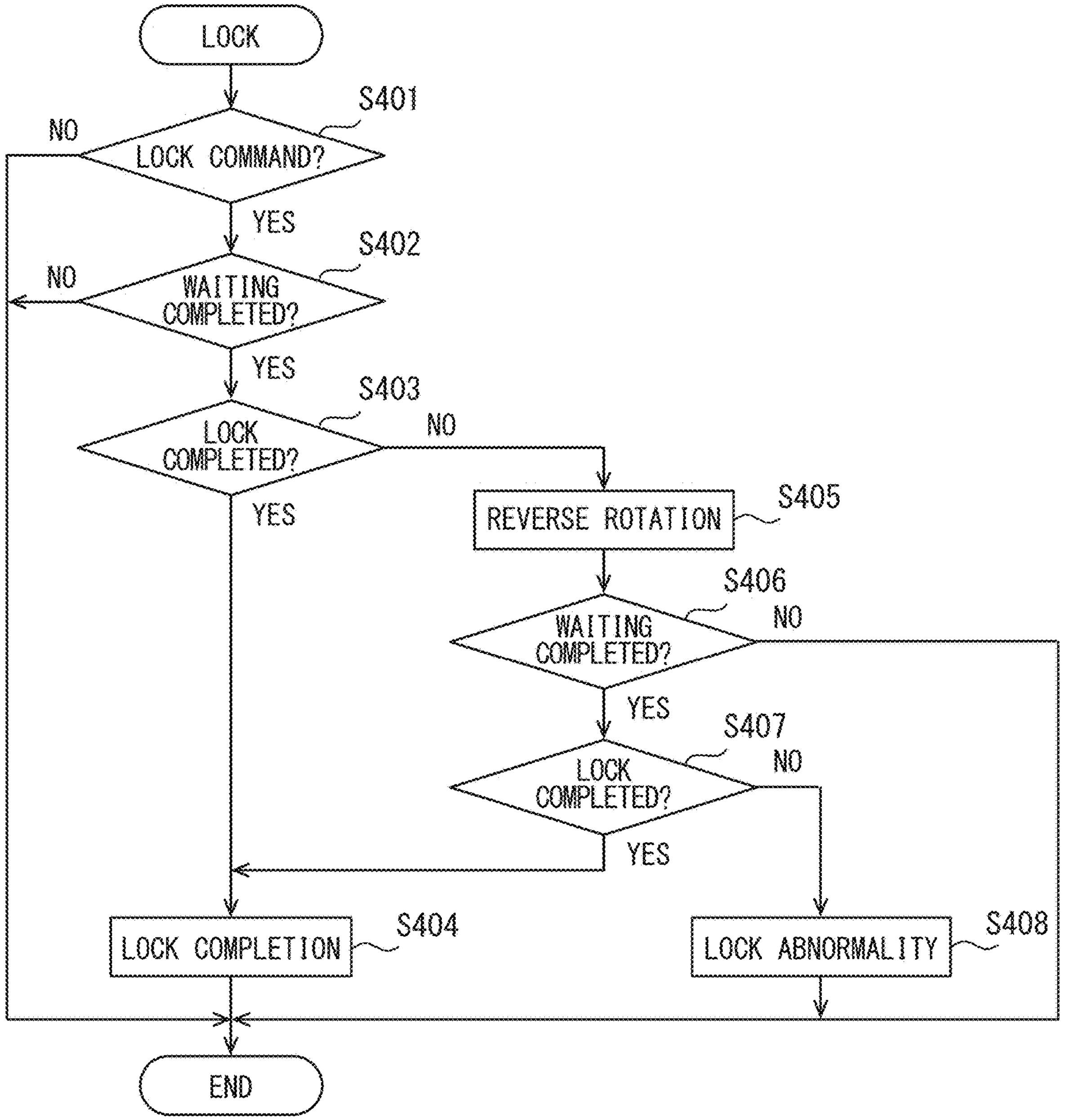
FIG. 17 is a flowchart showing a procedure of a lock process according to a sixth embodiment.

In step S401 shown in FIG. 17, the motor control unit 82 determines whether there is a lock command. For example, the motor control unit 82 determines whether a lock command is output to the lock device 100. Examples of the state in which a lock command is output to the lock device 100 include a state in which the processes in steps S201 to S203 in the first embodiment are executed. For example, when the lock command process is executed, the motor control unit 82 determines that a lock command is output to the lock device 100. When a lock command is output to the lock device 100, the motor control unit determines that there is a lock command.

In the eVTOL 10, a lock command is output in a state in which the propeller 20 performs the forward rotation. For example, when the propeller 20 that performs the forward rotation is stopped in response to a change in a flight state of the eVTOL 10 or the like, the motor control unit 82 decelerates the forward rotation of the propeller 20 by performing the process in step S202 or the like in the first embodiment. When a lock command is output in a state in which the propeller 20 performs the forward rotation in this manner, the lock device 100 drives the lock pin 101 to move from the unlocked position P12 to the locked position P11 in the forward rotation of the propeller 20.

When there is a lock command, the motor control unit 82 proceeds to step S402 and determines whether lock-waiting is completed. The lock-waiting is waiting for ensuring a time for the lock device 100 to lock the propeller 20. For example, the motor control unit 82 determines whether a waiting time reaches a reference time in the forward rotation of the propeller 20. The waiting time is an elapsed time from when a lock command is output to the lock device 100. The reference time is a time of a predetermined length, and is stored in the memory 82*b*, for example. For example, the reference time is set to a length equal to or longer than a time required for the shaft groove 55 to reach the lock pin 101 as the propeller 20 rotates. When the waiting time reaches the reference time, the motor control unit 82 determines that the lock-waiting is completed in the forward rotation of the propeller 20, and proceeds to step S403.

In step S403, the motor control unit 82 determines whether the lock of the propeller 20 is completed, as in step S206 of the first embodiment. In the forward rotation of the propeller 20, the motor control unit 82 determines whether the lock pin 101 is moved to the locked position P11. When the shaft groove 55 reaches the position facing the pin portion 103 as the propeller 20 performs the forward rotation, the pin portion 103 enters the shaft groove 55 due to the mechanical pressing force F12, and thus the lock pin 101 is moved to the locked position P11. When the lock pin 101 is moved to the locked position P11, the motor control unit 82 determines that the lock is completed using the forward rotation of the propeller 20. A function of executing the process in step S403 in the motor control unit 82 corresponds to a one-direction determination unit.

The motor control unit 82 may determine whether the rotation of the propeller 20 is stopped, in addition to determining whether the lock pin 101 is at the locked position P11. The motor control unit 82 determines that the lock of the propeller 20 is completed when the rotation of the propeller 20 is stopped and the lock pin 101 is at the locked position P11. Thus, an erroneous determination for the determination as to whether the lock of the propeller 20 is completed can be reduced.

When the lock is completed in the forward rotation of the propeller 20, the motor control unit 82 proceeds to step S404. In step S404, the motor control unit 82 performs the lock completion process as in step S207 of the first embodiment.

When the lock is not completed in the forward rotation of the propeller 20, the motor control unit 82 proceeds to step S405. Examples of the case where the lock of the propeller 20 is not completed include a case where the forward rotation of the propeller 20 stops in a state in which the shaft groove 55 does not reach the position facing the pin portion 103. In this case, it is conceivable that an abnormality causing the slow forward rotation of the propeller 20 occurs, such as a foreign matter getting caught in the propeller shaft 23. Examples of the case where the lock of the propeller 20 is not completed include a case where the lock device 100 does not operate normally even if the shaft groove 55 reaches the position facing the pin portion 103.

In step S405, the motor control unit 82 performs a reverse rotation process. The reverse rotation process is a process for performing the reverse rotation of the propeller 20. In the reverse rotation process, the motor 61 is energized such that the propeller 20 performs the reverse rotation. The motor control unit 82 causes the propeller 20 to perform the reverse rotation such that the pin portion 103 reaches the shaft groove 55 in the reverse direction in the circumferential direction of the propeller shaft 23. Even if the reverse rotation process is performed, the lock command process is continuously executed. When the pin portion 103 reaches the shaft groove 55, the motor control unit 82 causes the propeller 20 to perform the reverse rotation slowly such that the pin portion 103 enters the shaft groove 55 due to the mechanical pressing force F12. A function of executing the process in step S405 in the motor control unit 82 corresponds to an other-direction rotation unit.

In step S406, the motor control unit 82 determines whether the lock-waiting is completed as in step S402. For example, the motor control unit 82 determines whether a waiting time reaches a reference time in the reverse rotation of the propeller 20. The reference times in steps S403 and S406 may be times of the same length or times of different lengths. When the waiting time reaches the reference time, it is determined that the lock-waiting is completed in the reverse rotation of the propeller 20, and the process proceeds to step S407.

In step S407, the motor control unit 82 determines whether the lock of the propeller 20 is completed as in step S403. The motor control unit 82 determines whether the lock pin 101 is moved to the locked position P11 in the reverse rotation of the propeller 20. When the shaft groove 55 reaches the position facing the pin portion 103 as the propeller 20 performs the reverse rotation, the pin portion 103 enters the shaft groove 55 due to the mechanical pressing force F12, and thus the lock pin 101 is moved to the locked position P11. When the lock pin 101 is moved to the locked position P11, the motor control unit 82 determines that the lock is completed using the reverse rotation of the propeller 20. A function of executing the process in step S407 in the motor control unit 82 corresponds to an other-direction determination unit.

When the lock is completed in the reverse rotation of the propeller 20, the motor control unit 82 proceeds to step S404 and performs the lock completion process.

When the lock is not completed in the reverse rotation of the propeller 20, the motor control unit 82 proceeds to step S408. Examples of the case where the lock of the propeller 20 is not completed include a case where the reverse rotation of the propeller 20 stops in a state in which the shaft groove 55 does not reach the position facing the pin portion 103. In this case, it is conceivable that an abnormality causing the slow reverse rotation of the propeller 20 occurs, such as a foreign matter getting caught in the propeller shaft 23.

In step S408, the motor control unit 82 performs the lock abnormality process as in step S208 of the first embodiment. In the lock abnormality process, for example, a process of notifying that the lock of the propeller 20 is not completed is performed for both the forward rotation and the reverse rotation of the propeller 20. When the lock of the propeller 20 is not completed, the motor control unit 82 may re-execute the processes in steps S402 to S407 at least once.

According to the present embodiment, in the forward rotation of the propeller 20, when the lock pin 101 is not moved to the locked position P11, the reverse rotation of the propeller 20 is performed. In the configuration, even if the lock pin 101 is not moved to the locked position P11 in the forward rotation of the propeller 20, the lock pin 101 can be moved to the locked position P11 in the reverse rotation of the propeller 20. Therefore, a probability that the propeller 20 can be locked by the lock pin 101 is increased.

According to the present embodiment, in the reverse rotation of the propeller 20, it is determined whether the lock pin 101 is moved to the locked position P11. In the configuration, when the lock pin 101 is not moved to the locked position P11, a cause thereof can be estimated. For example, when the propeller 20 is not locked in the forward rotation of the propeller 20 and the propeller 20 is locked in the reverse rotation of the propeller 20, it can be estimated that an abnormality occurs in the forward rotation of the propeller 20. When the propeller 20 is not locked in both the forward rotation and the reverse rotation of the propeller 20, it can be estimated that an abnormality occurs in the lock device 100. When the cause of why the propeller 20 is not locked is estimated in this manner, the safety of the eVTOL 10 can be enhanced as compared with a case where a flight of the eVTOL 10 is continued while the cause is unknown.

Other Embodiments

The disclosure in the present description is not limited to the illustrated embodiments. The disclosure encompasses the illustrated embodiments and modifications thereof made by those skilled in the art. For example, the disclosure is not limited to the combination of components and elements described in the embodiments, and various modifications and implementations can be performed. The disclosure may be implemented in various combinations. The disclosure may have an additional portion that can be added to the embodiments. The disclosure encompasses the omission of components and elements of the embodiments. The disclosure encompasses the replacement or combination of components, elements between one embodiment and another embodiment. The disclosed technical scope is not limited to those described in the embodiments. The disclosed technical scope is indicated by the description of the claims, and should be construed to include all changes within the meaning and range equivalent to the description of the claims.

In each of the embodiments described above, multiple reception portions may be provided for one restriction member. For example, in the first embodiment described above, multiple shaft grooves 55 may be provided for one lock pin 101. For example, multiple shaft grooves 55 are arranged in the circumferential direction CD. In the configuration, the propeller 20 is locked when the one lock pin 101 is caught in any one of the multiple shaft grooves 55. Therefore, a time required until the propeller 20 is locked tends to be shortened. Examples of the configuration in which multiple shaft grooves 55 are arranged in the circumferential direction CD include a configuration in which two shaft grooves 55 are disposed at an interval of 180 degrees in the circumferential direction CD.

In each of the embodiments described above, the reception portion may be provided at any portion in the propulsion device 15 as long as the reception portion rotates together with the rotary blades. For example, in the first embodiment, the shaft groove 55 may be provided in the boss 22, the propeller shaft 23, the EPU shaft 51, and the motor shaft 65.

In each of the embodiments described above, the reception portion and the restriction member may have any shape as long as being capable of being caught to each other. For example, in the first embodiment, as long as the shaft groove 55 is caught by the restriction member such as the lock pin 101, the shaft groove 55 may not have a groove shape, and may be any of a protrusion portion and a depression portion. The lock pin 101 may not have a protrusion portion and may have a depression portion as long as the lock pin 101 is caught in the reception portion such as the shaft groove 55.

In each of the embodiments described above, in the propeller 20, the multiple blades 21 may be relatively displaceable in the circumferential direction CD. For example, the propeller 20 may include multiple propeller units. The multiple propeller units include a first propeller unit and a second propeller unit. Each of the first propeller unit and the second propeller unit includes multiple blades 21. The propeller 20 can be shifted between a first state and a second state. The first state is a state in which the propeller 20 rotates instead of being locked. In the first state, the blades 21 of the first propeller unit and the blades 21 of the second propeller unit are separated from each other in the circumferential direction CD. The second state is a state in which the propeller 20 is locked. In the second state, the blades 21 of the first propeller unit and the blades 21 of the second propeller unit overlap each other instead of being separated from each other in the circumferential direction CD. For example, in the second state, all the blades 21 extend along the roll axis.

The propulsion device 15 includes, as the lock device 100, a lock device that locks the first propeller unit and a lock device that locks the second propeller unit. The lock device used for the first propeller unit and the lock device used for the second propeller unit are capable of individually locking the first propeller unit and the second propeller unit. The lock device used for the first propeller unit and the lock device used for the second propeller unit are individually operated, and thus the propeller 20 can be held in the second state.

In each of the embodiments described above, the lock angle of the propeller 20 may be changeable. Examples of the configuration in which the lock angle of the propeller 20 is changeable include a configuration in which the lock angle of the propeller 20 is changeable in stages as in the third embodiment. Examples of the configuration include a configuration in which the lock device 100 includes multiple lock pins 101. For example, the lock device 100 may include three or more lock pins 101 for one propeller 20.

In each of the embodiments described above, the propulsion device 15 may include an electric lock mechanism that electrically locks the propeller 20 in addition to the lock device 100 that mechanically locks the propeller 20. Examples of the electric lock mechanism include a configuration in which only a specific phase among multiple phases of the motor 61 is continuously energized. The electric lock mechanism may continuously change the lock angle of the propeller 20. For example, when it is desired to lock the propeller 20 at a lock angle that cannot be implemented by the lock device 100, the electric lock mechanism may lock the propeller 20.

In each of the embodiments described above, the lock angle of the propeller 20 may be changed according to a flight state, a weather state, or the like. The weather state includes a direction and strength of wind. For example, when the lock angle appropriate for the flight state or the weather state is a lock angle that cannot be implemented by the lock device 100, the motor control unit 82 may lock the propeller 20 by the electric lock mechanism. For example, at a lock angle that can be implemented by the lock device 100, when resistance of the propeller 20 is too large for the flight of the eVTOL 10, it is preferable to lock the propeller 20 by the electric lock mechanism.

In the eVTOL 10, in addition to the lock angle of the propeller 20, a tilt angle of the propeller 20 and a pitch of the propeller 20 may be changed according to a flight state, a weather state, or the like. For example, in a configuration in which a pitch controller is provided, driving of the pitch controller is controlled according to a flight state or a weather state. The pitch controller can change the pitch of the propeller 20 by changing angles of the blades. For example, at least one of the lock angle, the tilt angle, and the pitch of the propeller 20 may be adjusted when crosswind against the eVTOL 10 is strong while the eVTOL 10 is descending or turning. In this case, the eVTOL 10 can fly in a desired manner in a state in which the resistance caused by the propeller 20 is as small as possible.

In each of the embodiments described above, the determination as to whether the lock pin 101 is moved to the locked position P11 may be performed first for any of the forward rotation and the reverse rotation of the propeller 20. That is, after it is determined whether the propeller 20 is locked in one of the forward rotation and the reverse rotation of the propeller 20, it may be determined whether the propeller 20 is locked in the other rotation. For example, after it is determined whether the propeller 20 is locked in the reverse rotation of the propeller 20, it may be determined whether the propeller 20 is locked in the forward rotation of the propeller 20. Specifically, when the lock pin 101 is not moved to the locked position P11 in the reverse rotation of the propeller 20, the motor control unit 82 may cause the propeller 20 to perform the forward rotation.

In each of the embodiments described above, the rotation sensor 52 may detect any rotation as long as the propulsion control device such as the motor control unit 82 can acquire the propeller rotation speed. For example, the rotation sensor 52 may directly detect the rotation of the propeller 20 or may detect the rotation of the motor shaft 65.

In each of the embodiments described above, the energization drive unit may not be the solenoid 110 or the like as long as at least one of the lock and the lock release of the propeller 20 can be performed by energizing the energization unit. For example, the energization drive unit may be an electric motor or the like. In the configuration in which the energization drive unit is an electric motor, a motor coil of the electric motor corresponds to the energization unit, and a motor shaft of the electric motor corresponds to the energization-based permission portion and the energization-based restriction portion.

In each of the embodiments described above, the mechanical restriction portion and the mechanical permission portion may not include an elastic member such as a spring as long as at least one of the lock and the lock release of the propeller 20 can be performed by the mechanical energy. For example, the mechanical restriction portion and the mechanical permission portion may include a hydraulic device or the like. For example, in the first embodiment, in the configuration in which the pressing unit 120 serving as the mechanical restriction portion includes a hydraulic device, the pressing unit 120 can move the lock pin 101 to the locked position P11 by a hydraulic force.

In each of the embodiments described above, one energization path may be connected to one energization unit, or multiple energization paths may be connected to one energization unit. For example, in the first embodiment, only one of the first parallel path 130*a* and the second parallel path 130*b* may be connected to one solenoid coil 111.

In each of the embodiments described above, one energization drive unit may include one energization unit or may include multiple energization units. For example, in the second embodiment, one solenoid 210 may include only one of the first solenoid coil 211A and the second solenoid coil 211B.

In each of the embodiments described above, the lock device 100 may be controlled by the flight control device 40. For example, at least one of the flight control device 40 and the motor control unit 82 may perform the propulsion control process. In the configuration, at least one of the flight control device 40 and the motor control unit 82 corresponds to the propulsion control device.

In each of the embodiments described above, in the eVTOL 10, a manner in which the propeller 20 is locked may be the same or different among the multiple propulsion devices 15. For example, in the eVTOL 10, the propulsion device 15 including any of the lock devices 100, 200, 300A, and 300B of the first to third embodiments may be included in the multiple propulsion devices 15.

In each of the embodiments described above, the propulsion device 15 may include at least one propeller 20 and at least one EPU 50. For example, in the propulsion device 15, one propeller 20 may be driven by at least one EPU 50. One EPU 50 may drive multiple propellers 20. The EPU 50 that does not include the propeller 20 may be referred to as the propulsion device 15.

In each of the embodiments described above, the eVTOL 10 may not be a tilt rotor aircraft. That is, in the eVTOL 10, the propeller 20 may not be able to tilt. For example, in the eVTOL 10, the multiple propellers 20 may include a lift-propeller 20 and a cruise-propeller 20. In the eVTOL 10, for example, the lift-propeller 20 is driven when ascending, and the cruise-propeller 20 is driven when moving forward.

In each of the embodiments described above, the flight vehicle on which the propulsion device 15 is mounted may not be an electric vertical take-off and landing aircraft. For example, the flight vehicle may be a rotorcraft, and a fixed-wing aircraft. The flight vehicle may be an unmanned aircraft carrying no person.

In each of the embodiments described above, the flight control device 40 is implemented by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units. Each of the logical units is, for example, a gate circuit. The digital circuit may include a memory in which at least one of a program and data is stored. The computer may be implemented by an analog circuit. The computer may be implemented by a combination of the digital circuit and the analog circuit.

(ii) The hardware processor may be at least one processor core that executes a program stored in at least one memory. In this case, the computer includes at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of (i) and (ii) described above. (i) and (ii) are provided on different chips or on a common chip.

That is, at least one of means and functions provided by the flight control device 40 can be provided by hardware alone, software alone, or a combination thereof.

DISCLOSURE OF TECHNICAL IDEAS

This description discloses multiple technical ideas described in multiple items listed below. Some items may be written in a multiple dependent form, in which subsequent items alternatively refer to preceding items. Some items may be written in a multiple dependent form referring to another multiple dependent form. These items written in a multiple dependent form define multiple technical ideas.

Technical Idea 1

A propulsion device (15) is configured to cause a motor (61) to rotate a rotary blade (20) to propel a flight vehicle (10). The propulsion device comprises: a restriction member (101, 201, 301A, 301B) movable between a restriction position (P11, P21, P31A, P31B), at which the restriction member is caught in a reception portion (55, 55A, 55B), which is configured to rotate together with the rotary blade, to restrict rotation of the rotary blade, and a permission position (P12, P22, P32A, P32B), at which the restriction member is not caught in the reception portion, to permit rotation of the rotary blade; and an energization drive unit (110, 210, 310A, 310B) including an energization unit (111, 211A, 211B, 311A, 311B) and configured to energize the energization unit to drive the restriction member to move from one of the restriction position and the permission position to the other of the restriction position and the permission position.

Technical Idea 2

The propulsion device according to technical idea 1, further comprises: a mechanical restriction portion (120) configured to apply mechanical energy to hold the restriction member at the restriction position when the energization unit is not energized.

Technical Idea 3

The propulsion device is according to technical idea 2. The energization drive unit includes an energization-based permission portion (112) configured to, when the energization unit is energized, move the restriction member from the restriction position to the permission position against a mechanical restriction force (F12), which is applied by the mechanical restriction portion to hold the restriction member at the restriction position. A plurality of energization paths (130*a*, 130*b*) are connected to the energization unit to move the energization-based permission portion toward the permission position when energized.

Technical Idea 4

The propulsion device is according to technical idea 3. The energization-based permission portion is configured to hold the restriction member at the permission position by continuing energization of the energization unit.

Technical Idea 5

The propulsion device is according to any one of technical ideas 1 to 4. The energization drive unit includes an energization-based restriction portion (212) configured to hold the restriction member at the restriction position by continuing energization of the energization unit.

Technical Idea 6

The propulsion device according to technical idea 5, further comprises: a mechanical permission portion (220) configured to apply mechanical energy to hold the restriction member at the permission position when the energization unit is not energized. The energization drive unit includes a plurality of energization units. The energization-based restriction portion is configured to, when the energization units are energized, move the restriction member from the permission position to the restriction position against a mechanical permission force (F22), which is applied by the mechanical permission portion to hold the restriction member at the permission position.

Technical Idea 7

The propulsion device is according to technical idea 6. In a state in which one of the energization units is energized, a single restriction force (F21A, F21B), which is applied by the energization-based restriction portion to move the restriction member from the permission position to the restriction position, is smaller than the mechanical permission force.

Technical Idea 8

The propulsion device is according to any one of technical ideas 1 to 7. The restriction member includes a release promoting portion (103*a*, 104) configured to promote release of a state in which the restriction member is caught in the reception portion.

Technical Idea 9

The propulsion device is according to any one of technical ideas 1 to 8. The restriction member includes a first restriction member (310A) and a second restriction member (310B). The second restriction member (310B) is configured to restrict rotation of the rotary blade at a position different from a position of the first restriction member in a rotation direction (CD) of the rotary blade. The energization drive unit includes a first energization unit (311A) and a second energization unit (311B) serving as the energization unit. The first energization unit is configured to be energized to move the first restriction member from one of the restriction position and the permission position to the other of the restriction position and the permission position. The second energization unit is configured to be energized to move the second restriction member from one of the restriction position and the permission position to the other of the restriction position and the permission position.

Technical Idea 10

The propulsion device according to any one of technical ideas 1 to 9, further comprises: a restriction execution unit (S203) configured to perform energization control on the energization unit to execute a restriction process to move the restriction member to the restriction position; and a permission execution unit (S301) configured to perform the energization control on the energization unit to execute a permission process to move the restriction member to the permission position.

Technical Idea 11

The propulsion device is according to technical idea 10. The restriction execution unit is configured to execute the restriction process, when a rotation speed of the rotary blade is smaller than a threshold.

Technical Idea 12

The propulsion device according to technical idea 10 or 11, further comprises: a rotation determination unit (S206) configured to determine whether the rotary blade rotates, when the restriction execution unit executes the restriction process.

Technical Idea 13

The propulsion device according to any one of technical ideas 1 to 12, further comprises: a one-direction determination unit (S403) configured to determine whether the restriction member has moved to the restriction position, when the rotary blade performs one of forward rotation and reverse rotation; and an other-direction rotation unit (S405) configured to cause the rotary blade to perform the other of the forward rotation and the reverse rotation, when the one-direction determination unit determines that the restriction member has not moved to the restriction position.

Technical Idea 14

The propulsion device is according to technical idea 13, further comprises: an other-direction determination unit (S407) configured to determine whether the restriction member has moved from the permission position to the restriction position, when the other-direction rotation unit performs rotation of the rotary blade.

Technical Idea 15

A propulsion control device (82) is configured to control rotation of a rotary blade (20) via a motor (61) to propel a flight vehicle (10). The propulsion control device comprises: a restriction execution unit (S203) configured to perform energization control on an energization unit (111, 211A, 211B, 311A, 311B) to execute a restriction process to move a restriction member (101, 201, 301A, 301B) to a restriction position (P11, P21, P31A, P31B), at which the restriction member is caught in a reception portion (55, 55A, 55B), which is configured to rotate together with the rotary blade, to restrict rotation of the rotary blade; and a permission execution unit (S301) configured to perform the energization control on the energization unit to execute a permission process to move the restriction member to a permission position (P12, P22, P32A, P32B), at which the restriction member is not caught in the reception portion, to permit rotation of the rotary blade.

Technical Idea 16

A propulsion control program is for controlling rotation of a rotary blade (20) via a motor (61) to propel a flight vehicle (10). The propulsion control program is configured to cause at least one processor (82*a*) to function as: a restriction execution unit (S203) configured to perform energization control on an energization unit (111, 211A, 211B, 311A, 311B) to execute a restriction process to move a restriction member (101, 201, 301A, 301B) to a restriction position (P11, P21, P31A, P31B), at which the restriction member is caught in a reception portion (55, 55A, 55B), which is configured to rotate together with the rotary blade, to restrict rotation of the rotary blade; and a permission execution unit (S301) configured to perform the energization control on the energization unit to execute a permission process to move the restriction member to a permission position (P12, P22, P32A, P32B), at which the restriction member is not caught in the reception portion, to permit rotation of the rotary blade.

What is claimed is:

1. A propulsion device configured to cause a motor to rotate a rotary blade to propel a flight vehicle, the propulsion device comprising:

- a restriction member movable between (i) a restriction position, at which the restriction member is caught in a reception portion, which is configured to rotate together with the rotary blade, to restrict rotation of the rotary blade, and (ii) a permission position, at which the restriction member is not caught in the reception portion, to permit rotation of the rotary blade;
- an energization drive unit including
  - an energization unit that, when energized, is configured to drive the restriction member to move from one of the restriction position and the permission position to the other of the restriction position and the permission position, and
  - an energization-based restriction portion configured to hold the restriction member at the restriction position by continuing energization of the energization unit;
- a mechanical permission portion configured to apply mechanical energy to hold the restriction member at the permission position when the energization unit is not energized; and
- a motor control unit configured to cause rotation of the motor to decelerate to slow down rotation of the rotary blade, the motor control unit comprising at least one processor programmed to:
  - when rotation of the rotary blade is smaller than a threshold, cause the energization drive unit to energize the energization unit to move the restriction member from the permission position to the restriction position;

cause the energization drive unit to stop the energization of the energization unit to allow for releasing restriction of the rotary blade by mechanical energy;

after stopping the energization of the energization unit, confirm that the rotary blade rotates; and when the rotary blade rotates, determine that restriction release of the rotary blade is completed.

2. The propulsion device according to claim 1, wherein:

the energization unit of the energization drive unit includes a first energization unit and a second energization unit;

the energization-based restriction portion is configured to, when the first energization unit and the second energization unit are energized, move the restriction member from the permission position to the restriction position against a mechanical permission force that is applied by the mechanical permission portion to hold the restriction member at the permission position;

in a state in which only the first energization unit is energized, a single restriction force, which is applied by the energization-based restriction portion to move the restriction member from the permission position to the restriction position, is smaller than the mechanical permission force; and in a state in which both the first energization unit and the second energization unit are energized, a total restriction force, which is applied by the energization-based restriction portion to move the restriction member from the permission position to the restriction position, is larger than the mechanical permission force.

3. The propulsion device according to claim 1, wherein:

the restriction member includes a release promoting portion configured to promote release of a state in which the restriction member is caught in the reception portion;

the restriction member is a pin portion; and the release promoting portion is a tapered surface of the pin portion.

4. The propulsion device according to claim 1, wherein the at least one processor of the motor control unit is programmed to, when the rotary blade does not rotate, cause the motor to repeatedly perform a forward rotation and a reverse rotation such that the rotary blade swings in a circumferential direction.

5. The propulsion device according to claim 4, wherein when restriction of the restriction member cannot be released even after the motor repeatedly performs the forward rotation and the reverse rotation, the at least one processor of the motor control unit is programmed to cause the restriction to be forcibly released by rotating the rotary blade.

6. The propulsion device according to claim 1, wherein the restriction member includes a fragile portion that is locally fragile as compared with another portion of the restriction member.

7. The propulsion device according to claim 1, wherein the at least one processor of the motor control unit is programmed, after the restriction member is moved from the permission position to the restriction position, to confirm that the rotary blade does not rotate by causing a rotation force in the rotary blade to be generated.

8. The propulsion device according to claim 1, wherein the at least one processor of the motor control unit is further programmed to determine whether the restriction member has moved to the restriction position when the rotary blade performs one of forward rotation and reverse rotation, and cause the rotary blade to perform the other of the forward rotation and the reverse rotation when it is determined that the restriction member has not moved to the restriction position.

9. The propulsion device according to claim 8, wherein the at least one processor of the motor control unit is programmed to determine whether the restriction member has moved from the permission position to the restriction position when the rotary blade performs the other of the forward rotation and the reverse rotation.

10. A propulsion control device configured to control rotation of a rotary blade via a motor to propel a flight vehicle, the propulsion control device comprising at least one processor programmed to:

perform energization control on an energization unit to restriction member is caught in a reception portion, which is configured to rotate together with the rotary blade, to restrict rotation of the rotary blade, and (ii) hold the restriction member at the restriction position by continuing energization of the energization unit;

perform the energization control on the energization unit to move the restriction member to a permission position, at which the restriction member is not caught in the reception portion and at which the restriction member is held when the energization unit is not energized by applied mechanical energy of a mechanical permission portion, to permit rotation of the rotary blade;

cause rotation of the motor to decelerate to slow down rotation of the rotary blade;

when rotation of the rotary blade is smaller than a threshold, cause an energization drive unit to energize the energization unit to move the restriction member from the permission position to the restriction position;

cause the energization drive unit to stop the energization of the energization unit to allow for releasing restriction of the rotary blade by mechanical energy;

after stopping the energization of the energization unit, confirm that the rotary blade rotates; and when the rotary blade rotates, determine that restriction release of the rotary blade is completed.

11. A non-transitory computer readable medium storing a program for controlling rotation of a rotary blade via a motor to propel a flight vehicle, the program comprising instructions configured to, when executed by at least one processor, to cause the at least one processor to:

perform energization control on an energization unit to (i) move a restriction member to a restriction position, at which the restriction member is caught in a reception portion, which is configured to rotate together with the rotary blade, to restrict rotation of the rotary blade, and (ii) hold the restriction member at the restriction position by continuing energization of the energization unit;

perform the energization control on the energization unit to move the restriction member to a permission position, at which the restriction member is not caught in the reception portion and at which the restriction member is held when the energization unit is not energized by applied mechanical energy of a mechanical permission portion, to permit rotation of the rotary blade;

cause rotation of the motor to decelerate to slow down rotation of the rotary blade;

when rotation of the rotary blade is smaller than a threshold, cause an energization drive unit to energize the energization unit to move the restriction member from the permission position to the restriction position;

cause the energization drive unit to stop the energization of the energization unit to allow for releasing restriction of the rotary blade by mechanical energy;

after stopping the energization of the energization unit, confirm that the rotary blade rotates; and when the rotary blade rotates, determine that restriction release of the rotary blade is completed.

12. A propulsion control device configured to control rotation of a rotary blade via a motor to propel a flight vehicle, the propulsion control device comprising:

at least one of (i) a circuit and (ii) a processor having a memory storing computer program code, wherein the at least one of the circuit and the processor having the memory is configured to cause the propulsion control device to:

perform energization control on an actuator to (i) move a restriction member to a restriction position, at which the restriction member is caught in a reception portion, which is configured to rotate together with the rotary blade, to restrict rotation of the rotary blade, and (ii) hold the restriction member at the restriction position by continuing energization of the actuator;

perform the energization control on the actuator to move the restriction member to a permission position, at which the restriction member is not caught in the reception portion and at which the restriction member is held when the actuator is not energized by applied mechanical energy of a mechanical permission portion, to permit rotation of the rotary blade;

cause rotation of the motor to decelerate to slow down rotation of the rotary blade;

when rotation of the rotary blade is smaller than a threshold, cause an energization drive unit to energize the energization unit to move the restriction member from the permission position to the restriction position;

cause the energization drive unit to stop the energization of the energization unit to allow for releasing restriction of the rotary blade by mechanical energy;

after stopping the energization of the energization unit, confirm that the rotary blade rotates; and when the rotary blade rotates, determine that restriction release of the rotary blade is completed.

* * * * *